United States Patent [19]
Parker et al.

[11] Patent Number: 5,543,941
[45] Date of Patent: * Aug. 6, 1996

[54] METHOD AND APPARATUS FOR HALFTONE RENDERING OF A GRAY IMAGE USING A BLUE NOISE MASK

[75] Inventors: Kevin J. Parker, Rochester, N.Y.; Theophano Mitsa, Iowa City, Iowa

[73] Assignee: Research Corporation Technologies, Inc., Tucson, Ariz.

[*] Notice: The portion of the term of this patent subsequent to May 5, 2009, has been disclaimed.

[21] Appl. No.: 251,140

[22] Filed: May 31, 1994

Related U.S. Application Data

[63] Continuation of Ser. No. 801,921, Dec. 3, 1991, Pat. No. 5,341,228, which is a continuation-in-part of Ser. No. 622,056, Dec. 4, 1990, Pat. No. 5,111,310.

[51] Int. Cl.$^6$ ................................................. H04N 1/46
[52] U.S. Cl. ........................ 358/534; 358/523; 358/466; 358/456; 382/270
[58] Field of Search .................................. 358/534, 536, 358/523, 524, 535, 527, 456, 455, 465, 466, 458, 463, 460, 447; 382/54, 254, 270 268

[56] References Cited

U.S. PATENT DOCUMENTS

| | | | |
|---|---|---|---|
| 3,953,668 | 4/1976 | Judice | 348/798 |
| 4,377,821 | 3/1983 | Sautter et al. | 348/472 |
| 4,389,672 | 6/1983 | Bowen et al. | 348/574 |
| 4,630,125 | 12/1986 | Roetling | 358/458 |
| 4,796,094 | 1/1989 | van Dorsselaer | 358/457 |
| 5,313,287 | 5/1994 | Barton | 358/457 |
| 5,323,247 | 6/1994 | Parker et al. | 358/457 |
| 5,363,213 | 11/1994 | Coward et al. . | |
| 5,375,002 | 12/1994 | Kim et al. . | |
| 5,377,041 | 12/1994 | Spaulding et al. . | |

OTHER PUBLICATIONS

J. P. Allebach. "Aliasing and Quantization in the Efficient Display of Continuous Tone Imagery". *Journal of the Optical Society of America*, 69(6):869–877, Jun. 1979.

J. P. Allebach and R. N. Stradling. "Computer–aided Design of Dither Signals for Binary Display of Images". *Applied Optics*, 18(15):2708–2713, Aug. 1979.

C. Allen and R. A. Schindler. "Determining Image Quality from Electronic or Digital Signal Characteristics". In *SPIE Advances in Image Transmission*, vol. 249, pp. 179–184, 1980.

D. Anastassiou and S. Kollias. "Digital Halftoning Using Neural Networks". In *SPIE Visual Communications and Image Processing* vol. 1001, pp. 1062–1069, 1988.

O. Bryngdahl. "Halftone Images: Spatial Resolution and Tone Reproduction". *Journal of the Optical Society of America*, 68(3):416–422, Mar. 1978.

F. W. Campbell and D. G. Green. "Optical and Retinal Factors Affecting Visual Resolution". *Journal of Physics*, 181:576–593, 1965.

(List continued on next page.)

*Primary Examiner*—Edward L. Coles, Sr.
*Assistant Examiner*—Fan Lee
*Attorney, Agent, or Firm*—Wigman, Cohen, Leitner & Myers, P.C.

[57] ABSTRACT

A method of and system for rendering a halftone image of a gray scale image by utilizing a pixel-by-pixel comparison of the gray scale image against a blue noise mask is disclosed in which the gray scale image is scanned on a pixel-by-pixel basis and compared on a pixel-by-pixel basis to an array of corresponding data points contained in a blue noise mask stored in a PROM or computer memory in order to produce the desired halftoned image. Both digital and optically implemented halftone methods are disclosed. Application specific modifications of the blue noise mask as well as its use for producing halftoned color images are also disclosed.

11 Claims, 9 Drawing Sheets

OTHER PUBLICATIONS

P. Carnevali, L. Coletti, and S. Patarnello. "Image Processing by Simulated Annealing". *IBM Journal of Research and Development*, 29:569–579, Nov., 1985.

R. Eschbach and R. Hauck. "A 2–D Pulse Density Modulation by Iteration for Halftoning". *Optics Communications*, 62(5):300–304, Jun. 1987.

G. S. Fawcett and G. F. Schrack. "Halftoning Techniques Using Error Diffusion". In *Processings of the SID*, vol. 27(4), pp. 305–308, 1986.

J. P. Guilford. *Psychometric Methods*. McGraw–Hill, 1954.

T. A. Hentea and V. R. Algazi. "Perceptual Models and the Filtering of High Contrast Achromatic Images". *IEEE Transactions on Systems, Man, and Cybernetics*, SMC–14(2):230–246, Apr. 1984.

J. O. Limb. "Distortion Criteria of the Human Viewer". *IEEE Transactions on Systems, Man, and Cybernetics*, SMC–9(12):778–793, Dec., 1979.

J. L. Mannos and D. J. Sacrison. "The Effect of a Visual Fidelity Criterion on the Encoding of Images". *IEEE Transactions on Information Theory*, IT–20(4):525–535, Jul., 1974.

S. Matsumoto and B. Liu. "Analytical Fidelity Measures in the Characterization of Halftone Processes". *Journal of the Optical Society of America*, 70(10):1248–1254, 1980.

P. W. Melntchuck and R. Shaw. "Fourtier Spectra of Digital Halftone Images containing Dot–position Errors". *Journal of the Optical Society of America*, 5(8):1328–1338, Aug., 1988.

T. Mitsa and K. J. Parker. "Digital Halftoning using a Blue Noise Mask". In *SPIE Electronic Imaging Conference*, vol. 1452, pp. 47–56, Feb., 1991.

W. Naing, Y. Miyake, N. Abe, and S. Kubo. "Analysis of Tone Reproduction Characteristics for Inkjet Images by a Modified Yule–Nielsen Equation". *Journal of Imaging Technology*, 14(1):6–11, Feb., 1988.

P. G. Roetling. "Visual Performance and Image Coding". In *SPIE/OSA Image Processing*, vol. 74, pp. 195–199, 1976.

R. A. Schindler. "Physical Measures of Image Quality and their Relationship to Performance". In *SPIE Advances in Display Technology*, vol. 199, pp. 117–125, 1979.

J. Sullivan, R. Miller, and G. Pios. "Image Halftoning Using Visual Error Diffusion". *Journal of the Optical Society of America*, 1990 in Press; [Published: 10 (8):1714–1724, 1993].

J. Sullivan. L. Ray, and R. Miller. "Design of Minimum Visual Modulation Halftone Patterns". *IEEE Transactions on Systems, Man, and Cybernetics*, 21(1):33–38, Jan.–Feb., 1991.

J. W. Wesner. "Screen Patterns Used in Reproduction of Continuous–tone Graphics". *Applied Optics*, 13(7):1703–1710, Jul., 1974.

Alleback, J. P. and B. Liu (1976) "Random quasi–periodic halftone process", *J. Opt. Soc. Am.*, vol. 66, pp. 909–917.

Alleback, J. P. and B. Liu (1977) "Analysis of halftone dot profile and aliasing in the discrete binary representation on images", *J. Opt. Soc. Am.*, vol. 67, pp. 1147–1154.

Alleback, J. P. (1978) "Random nucleated halftone screening", *Photogr. Sci. Eng.*, vol. 22, No. 2, pp. 89–91.

Alleback, J. P. (1980) "Binary display of images when spot size exceeds step size", *Applied Optics*, vol. 19, pp. 2513–2519.

Alleback, J. P. (1981) "Visual model–based algorithms for halftoning images", *Proc. SPIE*, vol. 310, pp. 151–158.

Anastassiou, D. and K. S. Pennington (1982) "Digital halftoning of Images", *IBM J. Res. Develop.*, vol. 26, pp. 687–697.

Baldwin, M. W. (1940) "The subjective sharpness of simulated television images", *Proc. IRE*, Oct., pp. 458–468.

Bartlett, M. S. (1955) *An Introduction to Stochastic Processes with Special Reference to Methods and Applications*. New York: Cambridge University Press, pp. 274–284.

Bayer, B. E. (1973) "An optimum method for two level rendition of continuous–tone pictures", *Proc. IEEE Int. Conf. Commun., Conference Record*, pp. (26–11)–(26–15).

Billotet–Hoffman, C. and O. Bryngdahl (1983) "On the error diffusion technique for electronic halftoning", *Proc. SID*, vol. 24, pp. 253–258.

Bracewell, R. N. (1978) *The Fourier Transform and Its Application*. New York: McGraw–Hill.

Campbell, F. W., J. J. Kulikowski, J. Levinson (1966) "The effect of orientation on the visual resolution of gratings", *J. Physiology London*, vol. 187, pp. 427–436.

Chao, Y. (1982) "An investigation into the coding of halftone pictures", M.I.T. Ph.D. Thesis.

Clapper, F. R. and J. A. Yule (1953) "The effect of multiple internal reflections on the densities of half–tone prints on paper", *J. Opt. Soc. of Am.*, vol. 43, No. 7, pp. 600–603.

Cornsweet, T. N. (1970) *Visual Perception*, New York: Academic Press.

Dippe, M. A. and E. H. Wold (1985) "Antialiasing through stochastic sampling", *Computer Graphics* (AMC Siggrpaph'85 Conf. Proc.), vol. 19, No. 3, pp. 69–78.

Dudgeon, D. E. and R. M. Mersereau (1984) *Multidimensional Digital Signal Processing*, Englewood Cliffs, N.J.: Prentice–Hall, pp. 39–41.

Engeldrum, P. G. (1985) "Computing color gamuts of inl–jet printing systems", *SID Int. Sym. Digest of Tech. Papers*, pp. 385–388.

Floyd, R. W., and L. Steinberg (1975) "An adaptive algorithm for spatial grey scale", *SID Int. Sym. Digest of Tech Papers*, pp. 36–37.

Floyd. R. W., and L. Steinberg (1976) "An adoptive algorithm for spatial greyscale", *Proc. SID*, vol. 17/2, pp. 76–77.

Freund, J. E. (1971) *Mathematical Statistics*. Englewood, NJ: Prentice–Hall.

Garcia, A. (1986) "Efficient rendering of synthetic images", M.I.T. Ph.D. Thesis.

Gardner, M. (1978) "White and brown music, fractal curves and one–over–f fluctuations", *Scientific Am.*, Apr., pp. 16–32.

Goodall, W. M. (1951) "Television by pulse code modulation", *Bell Sys. Tech. Journal*, vol. 30, pp. 33–49.

Graham, C. H., ed. (1965) *Vision and Visual Perception*, New York: John Wiley & Sons.

Hamill, P. (1977) "Line printer modification for better grey level pictures", *Computer Graphics and Image Proc.*, vol. 6, pp. 485–491.

Hecht, E. and A. Zajac (1974) *Optics*. Reading, MA: Addison–Wesley, pp. 361–363.

Heckbert, P. S. (1982) "Color image quantization for frame buffer display", *Computer Graphics* (AMC Siggrpaph'82 Conf. Proc.), vol. 16, No. 3, pp. 297–307.

Higgins, G. C. and K. Stultz (1948) "Visual acuity as measured with various orientations of a parallel–line test object," *J. Opt. Soc. Am.*, vol. 38, No. 9, pp. 756–758.

Holladay, T. M. (1980) "An optimum algorithm for halftone generation for displays and hard copies", *Proc. SID*, vol. 21, No. 2, pp. 185–192.

Jaeger, C. W., H. McManus, and D. Titterington (1984) "The influence of ink/media interactions on copy quality ink–jet printing" *Proc. SID*, vol. 25/1, pp. 65–70.

Jarvis, J. F., and C. S. Roberts (1976) "A new technique for displaying continuous–tone images on a bilevel display", *IEEE Tran. on Commun.*, vol. COM–24, pp. 891–898.

Jarvis, J. F., C. N. Judice, and W. H. Ninke (1976) "A survey of techniques for the display of continuous–tone pictures on bilevel displays", *Computer Graphics and Image Processing*, vol. 5, pp. 13–40.

Kermisch, D. and P. G. Roetling (1975) "Fourier Spectrum of halftone images", *J. Opt. Soc. Am.*, vol. 65, pp. 716–723.

Knowlton, K. and L. Harmon (1972) "Computer–produced greyscales", *Computer Graphics and Image Proc.*, vol. 1, pp. 1–20.

Kuhn, L. and R. A. Myers (1979) "Ink–jet printing", *Scientific American*, vol. 240, No. 4, pp. 162–178, Apr.

Limb J. O. (1969) "Design of dither waveforms for quantized visual signals", *Bell Sys. Tech. J.*, Sep., pp. 2555–2582.

Lippel, B. and M. Kurland (1971) "The effect of dither on luminance quantization of pictures", *IEEE Trans. Comm.* vol. COM–19, No. 6, pp. 879–888.

Lippel, B. (1976) "Two and three–dimensional ordered dither in bi–level picture displays", *Proc. SID*, vol. 17/2, pp. 115–121.

Lippel, B. (1978) "Comments on 'A new technique for displaying continuous–tone images on a bilevel diplay'", *IEEE Trans. Commun.*, vol. COM–26, pp. 309–310.

Mandelbrot, B. and R. Voss (1983) "Why is nature fractal and whenshould noises be scaling?", *Noise in Physical Systems and 1/f Noise*. New York: North Holland Physics Publishing, pp. 31–39.

Marks, R. J. (1986) "Multidimensional–signal sample depenndency at Nyquist densities", *J. Opt. Soc. Am. A*, vol. 3, No. 2, pp. 268–273.

Mersereau, R. M. (1978) "Two–dimensional signal processing from hexagonal rasters", *IEEE International Conf. on Acoustics, Speech, and Signal Processing*, pp. 739, 742.

Mesereau, R. M. (1979) "The processing of hexagonally sampled two–dimensional signals", *Proc. IEEE*, vol. 67, No. 6, pp. 930–949.

Musha, T. (1981) "1/f fluctuations in biological systems", *Proc. 3rd symposium on 1/f fluctuations*, pp. 143–146.

Papoulis, A. (1984) *Probability, Random Variables, and Stochastic Processes*. New York: McGraw–Hill, p. 178.

Perry, B. and M. L. Mendelsohn (1964) "Picture generation with a standard line printer", *Comm. of the ACM*, vol. 7, No. 5, pp. 311–313.

Petersen, D. P. and D. Middleton (1962) "Sampling and reconstruction of wave–number–limited functions in N–dimensional Euclidean spaces", *Information and control*, vol. 5, pp. 279–323.

Ratzel, J. N. (1980) "The discrete representation of spatially continuous images", M.I.T. Ph.D. Thesis.

Roberts, L. G. (1962) "Picture coding using pseudo–random noise", *IRE Trans. Infor. Theory*, vol. IT–8, pp. 145–154.

Robinson, A. H. (1973) "Multidimensional Fourier transforms and image processing with finite scanning apertures", *Applied Optics*, vol. 12, No. 10, pp. 2344–2352.

Roetling, P. G. (1976) Halftone method for edge enhancement and moire suppression", *J. Opt. Soc. Am., vol. 66, pp. 985–989.

Roetling, P. G. (1976) "Visual performance and image coding", *Proc. SID*, vol. 17/2, pp. 111–114.

Roetling, P. G. (1977) "Binary approximation of continuous–tone images", *Photographic Science and Engineering*, vol. 21, pp. 60–65.

Roetling, P. G. and T. M. Holladay (1979) "Tone reproduction and screen design for pictorial electrographic printing", *J. Applied Photographic Eng.*, vol. 5, No. 4, pp. 179–182.

Schreiber, W. F. (1976) "Laser scanning for the graphic arts", *Proc. SPIE*, vol. 84, pp. 21–26.

Schreiber, W. F. (1983) "An electronic process camera", *Tech. Ass. of the Graphic Arts Proc.*, May.

Schreiber, W. F. (1983) *RLE Progress Report* No. 125, MIT, p. 6.

Schreiber, W. F. and D. E. Troxel (1985) "Transformation between continuous and discrete representation of images: a perceptual approach", *IEEE Trans. PAMI*, vol. PAMI–7, No. 2, pp. 178–186.

Schreiber, W. F. (1986) *Fundamentals of Electronic Imaging Systems: Some Aspects of Image Processing*. New York: Springer–Verlag.

Schroeder, M. R. (1969) "Images from computers", *IEEE Spectrum*, vol. 6, 66–78.

Shaw, R., P. D. Burns and J. C. Dainty (1981) "Particulate model for halftone noise in electrophotography I. Theory, and II. Experimental verification", *Proc. SPIE*, vol. 310, pp. 137–150.

Sonnenberg, H. (1982) "Laser–scanning parameters and latitudes in laser xerography", *Applied Optics*, vol. 21, pp. 1745–1751.

Sonnenberg, H. (1983) "Designing Scanners for Laser Printers", *Lasers & Applications*, Apr., pp. 67–70.

Stevenson, R. L. and G. R. Arce (1985) "Binary display of hexagonally sampled continuous–tone images", *J. Opt. Soc. Am. A*, vol. 2, No. 7, pp. 1009–1013.

Stoffel, J. C. and J. F. Moreland (1981) "A survey of electronic techniques for pictorial reproduction", *IEEE Tran. Commun.*, vol. 29, 1898–1925.

Stoffel, J. C. (1982) *Graphical and Binary Image Processing and Applications*. Dedham, MA: Artech House.

Stucki, P. (1979) "Image processing for document reproduction", in *Advances in Digital Image Processing*. New York: Plenum Press, pp. 177–218.

Stucki, P. (1981) "MECCA—a multiple–error correcting computation algorithm for bilevel image hardcopy reproduction", Research Report RZ1060, IBM Research Laboratory, Zurich, Switzerland.

Taylor, M. M. (1963) "Visual discrimination and orientation", *J. Opt. Soc. Am.*, vol. 53, Jun., pp. 763–765.

Ulichney, R. A. and D. Troxel (1982) "Scaling Binary Images with the Telescoping Template", *IEEE Trans. on Pattern Analysis and Machine Intelligence*, vol. PAMI–4, pp. 331–335.

Ulichney, R. A. (1985) "Generalized ordered dither", M.I.T., ATRP–T–51. also Digital Equipment Corporation, DEC–TR–412.

Ulichney, R. A. (1987) *Digital Halftoning*, Cambridge, MA: M.I.T. Press.

Voss, R. F. and J. Clark (1975) "'1/f noise' in music and speech", *Nature*, vol. 258, No. 5533, Nov. 27, pp. 317–318.

Voss, R. F. and J. Clarke (1978) "'1/f noise' in music: music from 1/f noise", *J. Acoustic Soc. Am.*, vol. 63, No. 1, pp. 258–263.

Voss, R. F. (1979) "1/f (flicker) noise: a brief review", *Proc. of the 33rd Annual Symposium on Frequency Control*, May 30–Jun. 1, 1979, pp. 40–46.

White, J. M. (1980) "Recent advances in thresholding techniques for facsimile", *J. Applied Photoraphic Eng.,* vol. 6, pp. 49–57.

Witten, I. H. and M. Neal (1982) "Using peano curves for bilevel display of continuous–tone images", *IEEE CG&A,* May, pp. 47–52.

Woo, B. (1984) "A survey of halftoning algorithms and investigation of the error diffusion technique", M.I.T. S.B. Thesis.

Yule, J. A. C. (1967) *Principles of Color Reproduction,* New York: John Wiley & Sons.

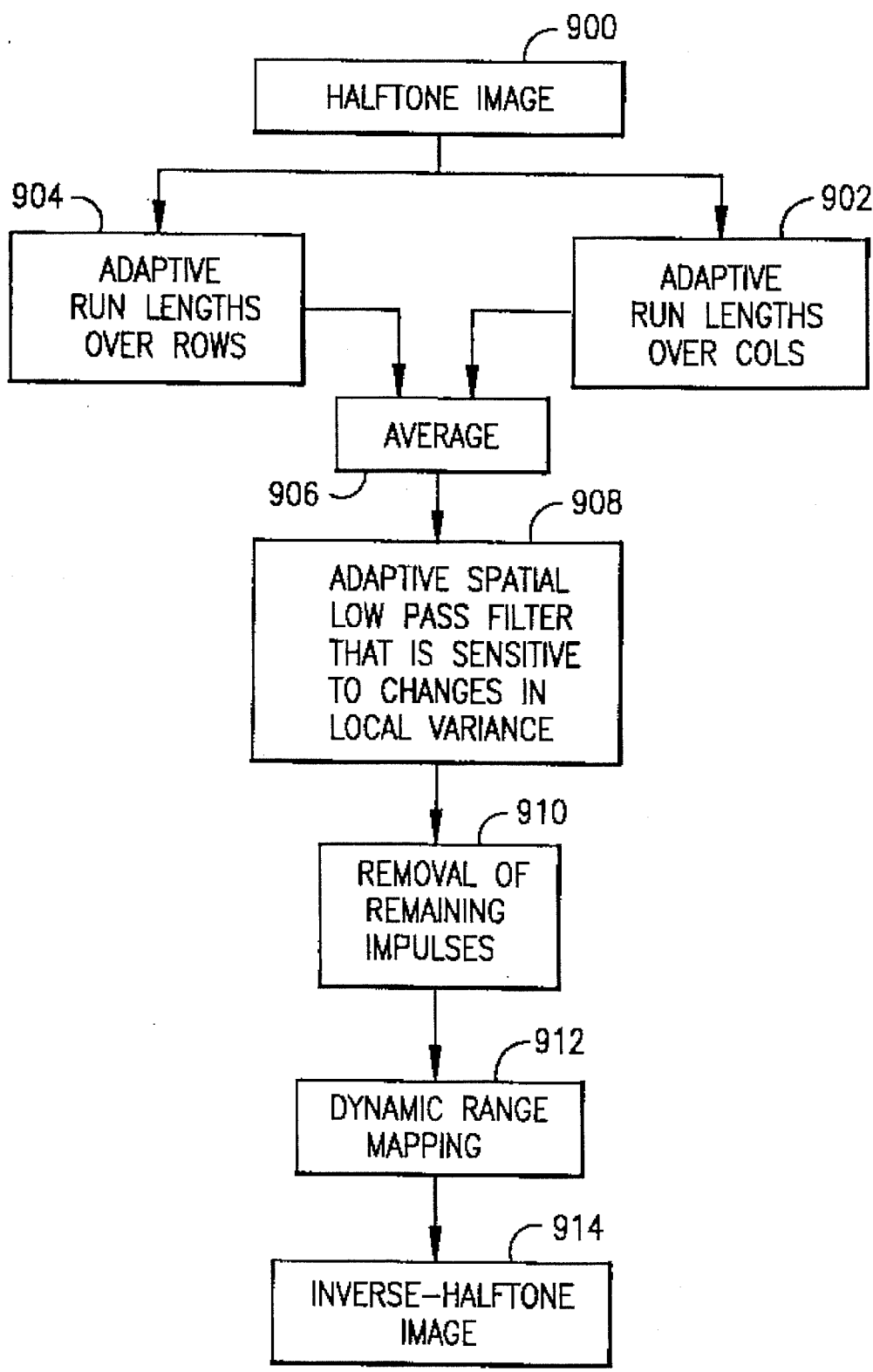

METHOD AND APPARATUS FOR HALFTONE RENDERING OF A GRAY IMAGE USING A BLUE NOISE MASK

This is a continuation of application Ser. No. 07/801,921 filed on Dec. 3, 1991, now U.S. Pat. No. 5,341,228, which is a continuation-in-part of U.S. patent application Ser. No. 07/622,056, filed Dec. 4, 1990, now U.S. Pat. No. 5,111,310, and entitled METHOD AND APPARATUS FOR HALFTONE RENDERING OF A GRAY SCALE IMAGE USING A BLUE NOISE MASK.

BACKGROUND OF THE INVENTION

The present invention relates generally to the halftoning of images. More particularly, the present invention relates to a method of and system for rendering a halftone by utilizing a pixel-by-pixel comparison of the gray scale image against a blue noise mask.

Many printing devices are not capable of reproducing gray scale images because they are hi-level. As a result, the binary representation of a gray scale image is a necessity in a wide range of applications such as laser printers, facsimile machines, lithography (newspaper printing), liquid crystal displays and plasma panels. Gray scale images are typically converted to binary images using halftone techniques. Halftoning renders the illusion of various shades of gray by using only two levels, black and white, and can be implemented either digitally (facsimile machines, laser printers) or optically (newspaper printing).

Halftoning algorithms are classified into point and neighborhood algorithms according to the number of points from the input gray scale image required to calculate one output point in the output binary image. In the case of digital halftoning, points correspond to pixels. In point algorithms, the halftoning is accomplished by a simple pointwise comparison of the gray scale image against a nonimage, usually a periodic (but not always) array or mask. For every point in the input image, depending on which point value (the gray scale image or the mask) is larger, either a 1 or 0 is placed respectively at the corresponding location in the binary output image. Halftoning using neighborhood algorithms is not done by simple pointwise comparison, but usually requires filtering operations that involve a number of points from the input gray scale image in order to calculate one point in the output image.

At present, given the existing halftoning algorithms, the choice for a specific halftoning algorithm depends on the target device and always requires a trade-off between image quality and speed. Neighborhood halftoning algorithms result in a good image quality (although the image is not completely artifact free), but they are slow and cannot be optically implemented. That leaves point algorithms as the only choice for optical applications such as newspaper printing. Point algorithms are fast and are suitable for all target devices, but the output usually suffers from artifacts such as periodic artifacts and false contours.

The halftoning system disclosed herein utilizes a point algorithm, and combines the output image quality of neighborhood algorithms with the speed and wide application range of point algorithms. A point algorithm is utilized and the halftoning is achieved by a pixelwise comparison against a nonimage array, called the "blue noise" mask.

The digital halftoning of images with multiple levels, such as gray scale levels, is known in the art. Two major techniques are currently in use. They are the ordered dither and the error diffusion methods. See *Digital Halftoning* by R. Ulichney, MIT Press, Cambridge, Mass. (1987). See also R. W. Floyd and L. Steinberg, "Adaptive algorithm for spatial gray scale", SID International Symposium Digest of Technical Papers, pps. 36–37. The Floyd and Steinberg paper is directed to the digital halftoning of a gray scale.

The major ordered dither techniques are the clustered-dot dither and dispersed-dot dither techniques. A white noise random dither technique is seldom utilized because it produces the poorest quality image and, of the other two dither techniques, clustered-dot is by far the most used. Both of those techniques are based upon a threshold screen pattern that is of a fixed size. For example, 6×6 threshold screens may be compared with the digital input values. If the input digital value is greater than the screen pattern number, a 1 is produced and, if it is less, a 0 value is assigned. The number of levels that can be represented using either technique depends on the size of the screen. For example, a 6×6 screen can produce 36 unique levels.

More levels can be achieved with larger patterns, however, a reduction in the effective resolution occurs because the ability to transition among levels is at a coarser pitch. At the pixel rate of about 300 to 500 per inch, which is the average pixel rate of copiers and laser printers, the pattern artifacts are visible for screen patterns larger than 4×4, and, since 16 levels do not provide an adequate precision for typical continuous-tone imagery, a suboptimal resolution is usually obtained.

One solution to such a problem is disclosed by Ulichney in a paper "Dithering with Blue Noise" published in the Proceedings of the IEEE, Vol. 76 No. 1, January 1988. In that article, a method of spatial dithering is described which renders the illusion of continuous-tone pictures on displays that are capable of only producing binary picture elements. The method produces a blue noise pattern high freqency white noise from a filter to provide desirable properties for halftoning. More specifically, Ulichney uses perturbed-weight error diffusion methods which when digitally implemented run at a much slower speed (approximately 100 times slower) than is attainable with the present invention.

Error diffusion techniques, such as that disclosed in the Ulichney IEEE article, are fundamentally different from ordered dither techniques in that there is no fixed screen pattern. Rather, a recursire algorithm is used that attempts to correct errors made by representing the continuous signal by binary values.

The error diffusion method described by Ulichney, and others, such as Floyd and Steinberg, also has the disadvantage that it requires scanning, convolution-style calculations and, although it can be implemented for use with copiers, facsimile machines, etc., requires local calculations. It cannot, however, be optically implemented. In addition, all error diffusion techniques, including those described by Ulichney and Floyd and Steinberg, show scanning and start-up artifacts, which are not present in the instant invention. Also, while Ulichney describes a method that produces blue noise, the blue noise patterns produced by the present invention are more isotropic than those produced by Ulichney or other error diffusion methods. Utilizing ordered dither methods produces notably periodic patterns that are even much more obtrusive than those produced by error diffusion methods.

In some prior art systems, all dot profiles corresponding to different gray levels were derived independently, as if each grade level was its own special case. Thus, for example, in U.S. Pat. No. 4,920,501, to Sullivan et al., many individual dot profiles, corresponding to the desired number of gray levels, must be stored. In the present invention, on the other hand, dot profiles are built "on top of" the profiles from lower gray levels, such that a single valued 2-dimensional function, that is, the cumulative array or blue noise mask, can be constructed. When that single valued function is thresholded at any level, the resulting binary pattern is exactly the blue noise dot profile design for that particular gray level, p(i,j,g), where p can be one or zero corresponding to black or white, i and j are coordinates of pixels, and g represents a gray level 0<g<1.

Another drawback to prior art methods is that the dot profile for a given gray level was designed to have blue noise properties by indirect methods, such as using an error diffusion filter with perturbed weights (Ulichney) or by a "simulated annealing" algorithm, as in U.S. Pat. No. 4,920, 501. The method disclosed herein is advantageous with respect to the prior art in that the desired blue noise power spectrum is produced through the use of a filter on the dot profile and is implemented directly in the transform domain. Such filtering results in a nearly ideal blue noise pattern with implicit long-scale periodicity because of the circular convolution implicit in the use of discrete Fourier transforms. However, the filtered pattern is no longer binary. Thus, a minimization of error approach is utilized in which the largest differences between the ideal, filtered, blue noise pattern and the unfiltered dot profile are identified. The magnitude and location of those differences indicate the pixels in which ones and zeros could be changed to produce a more ideal blue noise dot profile.

Display devices, including printing devices as well as media, have their own unique input-output characteristics. In some uses, such as medical ultrasound imaging, the user has traditionally been provided with some control as to the final gray scale mapping. For example, the user may be able to select between high and low contrast images. The display and film characteristics, however, must be accounted for in each rendition.

In the area of halftone rendering, traditional halftone screens using small (for example, 8×8 pixel) kernels provide only limited degrees of freedom to alter the input-output characteristics and usually a linear cumulative distribution function (CDF) has been reported. See *Digital Halftoning* by R. Ulichney, MIT Press, Cambridge, Mass. (1987). See also, R. Bayer, "An Optimum Method for 2 Level Rendition of Continuous Tone Pictures", IEEE International Conf. Comm., 1973, and G. C. Reid, *Postscript Language Program Design* (green book), Addison-Wesley Publishing Co., New York, N.Y. (1988), page 137. By a linear CDF, it is meant that 10% of the halftone kernel pixel contents will be less than 10% of the maximum value and that 50% of the pixels will contain values less than 50% of the maximum values, and so forth.

In the case of the blue noise mask method disclosed herein, a large unstructured pattern of, for example, 256×256 pixel kernels, provides sufficient degrees of freedom to modify the cumulative distribution function so as to provide both linear and non-linear mappings of input and output characteristics. That makes it possible to construct specialized blue noise masks in which a particular printer output and media characteristics can be compensated for by a modified blue noise mask generated as disclosed in this application.

The present inventive method herein may also be applied to color halftoning, by independently thresholding each of the component colors against the disclosed blue noise mask and then overprinting. Such method produces a pleasing pattern without any blurring of the image. Such method is a great improvement over the known prior art, which is discussed below.

In U.S. Pat. No. 5,010,398, there is disclosed a method for color corrections by dry dye etching using a photographically produced mask which may be used in the production of printing plates for printing reproductions of colored originals and in which a contact print is overexposed to a photographic mask. The photographic mask is constituted so as to isolate a selected area in addition to being exposed normally for obtaining an exact copy of an original halftone separation. The mask is electronically generated by scanning each separation, digitizing each signal and then storing the digital values in a digital storage device.

U.S. Pat. No. 4,974,067 relates to a multi-step digital color image reproducing method and apparatus which separates an original image into a plurality of color components to produce image data associated with each respective one of the color components. The image data are individually processed to provide a record of color component density data which data are used to record a halftone representation pattern of that color component.

An apparatus and methods for digital halftoning is disclosed in U.S. Pat. No. 4,924,301 for producing halftone screens or color separations from continuous tone intensity signals that are supplied by an optical scanner. Using a digital signal processor, the continuous tone intensity values are processed to establish memory maps which, in conjunction with a digital data output device such as a laser printer, produces the desired halftone screen. The digital signal processor utilizes a dither matrix in order to produce halftone screens having a screen angle that does not substantially differ from the screen angles of the yellow, cyan and magenta color separations in conventional four color halftone printing. A dither array is also utilized to produce the halftone screens having a screen angle that substantially differs from the screen angle used in the black halftone color separation in conventional four color halftone printing.

U.S. Pat. No. 4,342,046 relates to a contact screen for making color separation halftone blocks for use in a picture reproducing machine in which a plurality of halftone screens having different screen angles are arranged on a base film in the corresponding positions of color separation reproduction pictures to be reproduced on the base film and transparent blank spaces are formed between two adjacent halftone screens.

A method and apparatus for making monochrome facsimiles of color images on color displays is disclosed in U.S. Pat. No. 4,308,533 for making 35MM color slides from a color image created on a color cathode tube terminal. U.S. Pat. No. 3,085,878 relates to the preparation of traditional halftone screens for color separation.

U.S. Pat. No. 4,657,831 relates to the production of electrophotographic color proofs of halftone dot pattern images which closely simulate the dot gain of prints made with lithographic plates and liquid inks.

A process for the production of photographic masks is disclosed in U.S. Pat. No. 4,997,733 in which such masks are used for the tonal correction by dry dot etching in which the selection of a particular halftone color separation image or overlaying registering combination of halftone color separation images is determined on the basis of optical density differences in at least one such halftone color separation. Such differences include differences in contrast, between each area to be isolated as a substantially transparent area, and at least one particular background area surrounding each area to be isolated.

U.S. Pat. No. 4,477,833 is directed to a method of color conversion with improved interpolation in which an apparatus for converting a color image from one colored space to another colored space includes a memory which stores a finite number of output signals which represent colors in the output space and which is addressed by signals representing a color in the input space. The interpolation process is utilized in order to derive an output color value for an input color located between colors stored in the memory.

A method and apparatus for producing halftone printing forms with rotated screens based upon randomly selected screen threshold values is disclosed in U.S. Pat. No. 4,700,235. The screens have arbitrary screen angles and screen width. Screen dots are exposed on a recording media by means of a recording element whose exposure beam is switched on and off by a control signal.

None of the foregoing references have the advantages of the use of the blue noise mask method disclosed herein in producing pleasing, isotropic, non-clumpy, moire resistant patterns with only some spreading out of the color or ink but with no blurring of the image.

SUMMARY AND OBJECTS OF THE INVENTION

In view of the foregoing, it should be apparent that there still exists a need in the art for a method of and apparatus for the halftone rendering of gray scale images in which a digital data processor is utilized in a simple and precise manner to accomplish the halftone rendering to provide a binary scale image which is characterized by the pixelwise comparison of the image being analyzed against a blue noise mask. There also exists a need for the modification of such halftone rendering process in order to counter some undesirable printer and media dependent effects such that the halftone rendering of gray scales is modified to produce input and output characteristics unique to a particular type of device or media and in which the images produced are superior to those produced without such modification process.

It should likewise be apparent that there still exists a need in the art for a method for color halftoning by independently thresholding each of the component colors against a blue noise mask in order to produce a pleasing, isotropic, non-clumpy, moire resistant pattern with only some spreading out of the color or ink but with no blurring of the image.

More particularly, it is an object of this invention to provide a system for the halftone rendering of a gray scale image which has a simple and reliable mechanism for producing the desired image.

Still more particularly, it is an object of this invention to provide a system for the halftone rendering of a gray scale image which can be implemented either digitally or optically.

It is another object of this invention to provide a system for the halftone rendering of a gray scale image which tailors the image thus produced to compensate for particular output printer and media characteristics such that the undesired display of media characteristics can be substantially eliminated.

It is yet another object of this invention to provide a system for the halftone rendering of continuous tone color images such that pleasing images are produced with little spreading out of the color and with no blurring of the image.

Briefly described, these and other objects of the invention are accomplished by generating a blue noise mask which, when thresholded at any gray level g, produces a blue noise binary pattern appropriate for that gray level. After the blue noise mask has been generated, it is stored in a PROM. The image to be halftoned is then read by a scanner on a pixel-by-pixel basis and compared to the corresponding stored pixel in the blue noise mask to produce the resulting binary array. The binary image array is then converted to a binary display which is the resultant halftoned image.

After the blue noise mask has been generated and stored, it may be modified to tailor it for a particular output printer and media characteristics such that compensation is provided in a blue noise mask for undesired display and media characteristics. The blue noise mask is modified by altering the first order statistics or the cumulative distribution function (CDF) to counter such undesirable printer and media dependent effects. The blue noise mask may be modified in a variety of ways, all of which usually include punching the blue noise mask. Punching the blue noise mask involves setting the extreme low values to a certain minimum value, for example, 0 and setting the extreme high values to a certain maximum value, for example 255. The values between the maximum and the minimum are then re-linearized.

The method of generating and utilizing the blue noise mask discussed above can also be applied to color halftoning, by independently thresholding each one of the component colors against the blue noise mask and then overprinting the halftoned component color images. The blue noise mask can also be shifted by one pixel before it is used on each of the different color planes. In that manner, the color energy/is spread out over a larger space. For example, the blue noise mask can be shifted one pixel up or to the side, when the red image and blue image are being halftoned, respectively. Other variations and modifications for using the blue noise mask for color halftoning are discussed in the specification. Such principles may be used for either RGB halftoning or CMYK color printing.

In an optical implementation, the gray scale image is photographed through the generated blue noise mask and the resultant superposition is printed onto a high contrast film. An additive photographic process may also be utilized in which the blue noise mask is added to the gray scale image at the film plane, for example, by a double exposure process. The photographic blue noise mask can be obtained from a calculated blue noise array using a film printer interfaced to the PROM or computer in which the blue noise mask array is stored.

DETAILED DESCRIPTION OF THE PREFERRED EMBODIMENT

Figure 1:
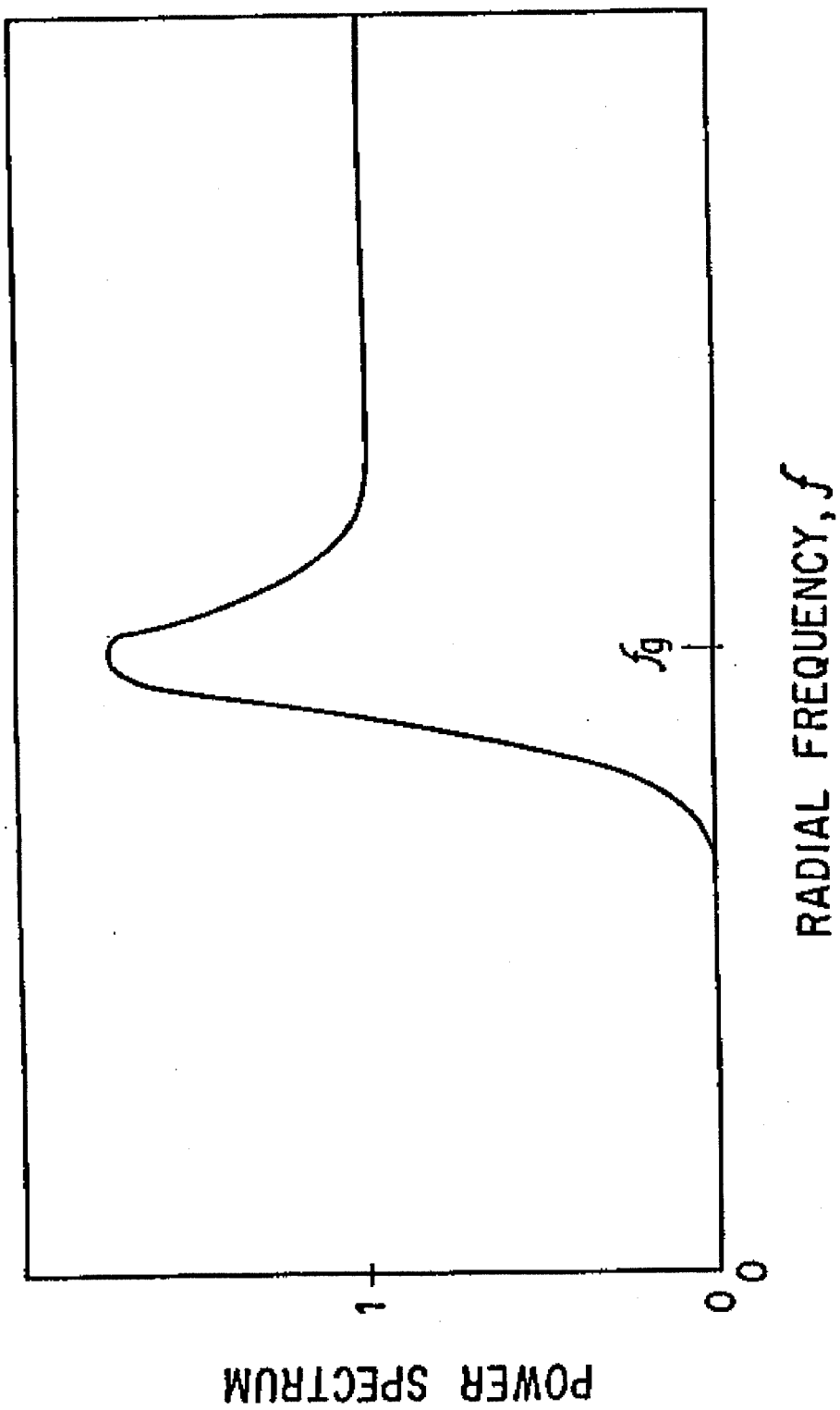
FIG. 1 is a drawing showing the power spectrum of a blue noise pattern formed in accordance with the present invention.

Prior to referring to the drawings, the following description of the theoretical underpinnings of the present invention is provided.

As described above, the present invention is a halftone rendering system which accomplishes its function by a pixel-by-pixel comparison of a gray scale image against a "blue noise" mask. As referred to herein, the term "blue noise" is a pattern with negligible low frequency components which possesses certain visually pleasing properties, as described by R. Ulichney in his book, *Digital Halftoning*.

In the present invention, depending upon which pixel is larger, either the gray scale image or the blue noise mask, a 1 or a 0 is placed in the binary (black or white) image file which is the halftone rendered version of the gray scale image. Using the notation that the gray scale image is M×N pixels in size and B-bits of gray per pixel, the blue noise mask can be a smaller array J×K in size where J is less than or equal to M and K is less than or equal to N with only B−1 bits per pixel.

The blue noise mask described herein is constructed to have unique first and second order properties. When thresholded at any level, for example at A% of the maximum level, exactly A out of every 100 pixels will be greater than the threshold value. In addition, the spatial distribution of the pixels above the threshold is arranged in such a manner as to form a blue noise pattern which has been shown to be visually pleasing.

The disclosed blue noise mask, therefore, has the characteristic that the first order statistics are uniformly distributed over gray levels. That is, when the blue noise mask is thresholded at a gray level g, exactly g×100% of all values are below the threshold. For g=0.5, exactly 50% of the blue noise mask pixels are above, and 50% below the threshold value. The blue noise mask disclosed herein also has the characteristic that when thresholded at any level g, the resulting bit pattern has a power spectrum consistent with and approximating the ideal blue noise pattern for that threshold. In addition, since the blue noise image is constructed with explicit "wraparound" properties, a small blue noise pattern of J×K pixels can be used to halftone render a larger M×N pixel's image, because the pixel-by-pixel comparison can proceed modulo J and modulo K in the respective directions, with no apparent discontinuities or obvious periodicities. However, the value of (J×K) should not be smaller than X/2, where X is the number of levels of the original gray scale image.

It is also desirable to describe the digital halftoning system of the present invention for the analog case in which discrete space is replaced by continuous space. Using such notation, x and y represent continuous space, while i and j represent discrete space. Thus, the gray scale image is denoted by f(x,y), the blue noise mask is denoted by m(x,y) and the output (halftoned) binary image is denoted by h(x,y).

Thus, for a B-bit image array f(i,j), the blue noise mask array m(i,j) is a B-bit array such that, when thresholded against f(i,j), up to $2^B$ levels of varying distribution of black and white dots can be represented on a rectangular grid. Note that the dimensions of the blue noise mask can be smaller than those of the gray scale image and that the halftoning of the gray scale image is achieved by a periodic repetition of m(i,j) over the entire image plane. For example, for a 256×256 8-bit class of images, a 128×128 8-bit blue noise mask array can be used.

The binary pattern that results after thresholding the blue noise mask at a constant level g is called the dot profile for that level. The dot profiles are arrays that have the same dimensions as the mask array, and consist of ones and zeros. The ratio of ones to zeros is different for every dot profile and depends on the gray level that particular dot profile represents. In the notation used herein, the higher the gray level, the more ones and less zeros that will be contained in the dot profile. p(i,j,g) is used to denote the value of the dot profile at pixel location (i,j) and for the gray level g. g=0 is used to represent black and g=1 is used to represent white. Thus, $0 \leq g \leq 1$. Also, by denoting as $f_{i,j}$ the value of the discrete space function f(i,j) at pixel location (i,j), a N×N binary image h(x,y) can be written as follows in terms of the dot profiles:

$$h(x,y) = \sum_{i=0}^{\frac{N}{2}-1} \sum_{j=0}^{\frac{N}{2}-1} p[m;n;f_{ij}] \, rect\left(\frac{x-mR}{R}\right) rect\left(\frac{y-nR}{R}\right) \quad (1)$$

where R is the spacing between the addressable points on the display device, and rect(x)=1 if |x|<½ and rect(x)=0 otherwise. Therefore, for any gray scale image, the corresponding binary image h(x,y) can be constructed as follows in terms of the dot profiles: For every pixel in the gray scale image array f(i,j) that is at the (i,j) location and has a value $f_{i,j}$=g, the corresponding pixel in the binary image array h(i,j) has a value that is given by the value of the g-level dot profile at the (i,j) location.

The dot profiles for every level are designed and combined in such a way as to build a single valued function, the blue noise mask. The blue noise mask is constructed such that when thresholded at any level, the resulting dot profile is a locally a periodic and isotropic binary pattern with small low-frequency components, which in the halftoning literature, is known as a blue noise pattern. Those dot profiles are not independent of each other, but the dot profile for level $g_1+\Delta g$ is constructed from the dot profile for level $g_1$ by replacing some selected zeros with ones. For example, for a N×N B-bit mask array and maximum pixel value given by $2^B$, $\Delta g$ is given by $\Delta g = \frac{1}{2}^B$ and the number of zeros that will change to ones, in order to go from level $g_1$ to level $g_1+\Delta g$ is $N^2/2^B$.

As the dot profile is changed from its pattern at $g_1$ to $g_1+\Delta g$, another array called the cumulative array is incremented in such a way as to keep track of the changes in dot profiles from gray level to gray level. That cumulative array (not a binary array but a B-bit array) becomes the blue noise mask because, when thresholded at any level g, the resulting binary pattern reproduces the dot profile for that level.

Referring now to the figures wherein like reference numerals are used throughout, there is shown in FIG. 1 a diagram of the power spectrum of a blue noise pattern which is free of a low frequency component and is radially symmetric. The absence of low frequency components in the frequency domain corresponds to the absence of disturbing artifacts in the spatial domain. Radial symmetry in the frequency domain corresponds to isotropy in the spatial domain. Isotropy, aperiodicity and the lack of low-frequency artifacts are all desirable properties in halftoning because they lead to visually pleasing patterns.

As shown in FIG. 1, the cutoff frequency $f_g$, which is termed the Principal Frequency, depends as follows on the gray level g:

$$f_g = \begin{cases} \sqrt{g} \ /R & \text{for } g \leq 1/2 \\ \sqrt{1-g} \ /R & \text{for } g > 1/2 \end{cases} \qquad (2)$$

where R, as before, is the distance between addressable points on the display and the gray level g is normalized between 0 and 1. As can be seen from the above equation, $f_g$ achieves its maximum value where g=½, since at that level the populations of black and white dots are equal and thus very high frequency components appear in the binary image.

For a N×N B-bit image with $2^B$ as the maximum pixel value, the blue noise mask is constructed as follows: First, the dot profile p[i,j,½] that corresponds to the 50% gray level is created. That dot profile is generated from a white noise pattern after filtering it with a highpassed circularly symmetric filter and results in a binary pattern having visually annoying low frequency components. In order to give blue noise properties to the p[i,j,½] dot profile, the following iteration procedure is utilized, similar to that shown in FIG. 2, which is a flow chart showing the steps for designing a blue noise mask for generating level g+Δg from level g.

Step 1. Take the 2-dimensional Fourier transform of the dot profile p[i,j,½] and obtain the dot profile P[u,v,½], where u and v are the transformed coordinates, and P represents the Fourier Transform.

Step 2. Apply a blue noise filter D(u,v,½) to the spectrum P[u,v,½] and in that way obtain the new spectrum P'[u,v,½] =P[u,v,½]×D(u,v,½). The blue noise filter is designed to produce in the dot profile spectrum P'[u,v,½] an average cross section along a radially symmetric line shown in FIG. 1. The principal frequency is given by $f_g=(1\sqrt{2})$ R.

Step 3. Take the Inverse Fourier transform of P'[u,v,½] and obtain p'[i,j,½], which is no longer binary but has much better blue noise properties.

Step 4. Form the difference e[i,j,½]=p'[i,j,½]−p[i,j,½]. That difference is referred to as the error array.

Step 5. Classify all pixels into two classes according to the value of p[i,j,½] for each pixel; all the zeros belong in the first class and all the ones in the second. Then, rank order all the pixels in those two classes according to the value of c[i,j,½] for each pixel.

Step 6. Set a limit, $l_\epsilon=t$, for the magnitude of the highest acceptable error. That limit is usually set equal to the average magnitude error. For the zeros, $l_\epsilon=t$ and for the ones, $l_\epsilon=t$. Change all the pixels that contain a zero and have an error higher than the defined limit to ones. Similarly, change all the pixels that contain a one and have an error smaller than the defined negative limit to zeros. The number of zeros that are changed to ones must be equal to the number of ones that are changed to zeros so that the total average is preserved. The initialization process is then complete.

The above procedure is then repeated until no pixels have an error higher than some predetermined error. Note that the magnitude of the average error becomes lower for both zeros and ones every time the procedure is repeated.

In order to finish the initialization procedure, refer to another N×N array, which is denoted as c[i,j,½] and referred to as the cumulative array, and give a value of $2^{B-1}$ to every pixel whose corresponding pixel in the dot profile has a value of zero, and give a value of $2^{B-1}-1$ otherwise. In that way, when the cumulative array, which eventually will become the blue noise mask, is thresholded at a 50% gray level, the resulting dot profile is equal to p[i,j,½].

After having generated in the above fashion the dot profile for the ½ gray level, the ½+Δg gray level is then constructed, where Δg is usually taken as $½^B$, the quantization limit. In general $\Delta g \geq ½^B$. The dot profile for the ½+Δg gray level is generated from the dot profile for the ½ level by converting $N^2/2^B$ zeros to ones. The selection of the pixels that contain a zero and will be replaced by a one is done following a procedure similar to the one described previously for the design of the ½ dot profile in FIG. 2.

Figure 2:
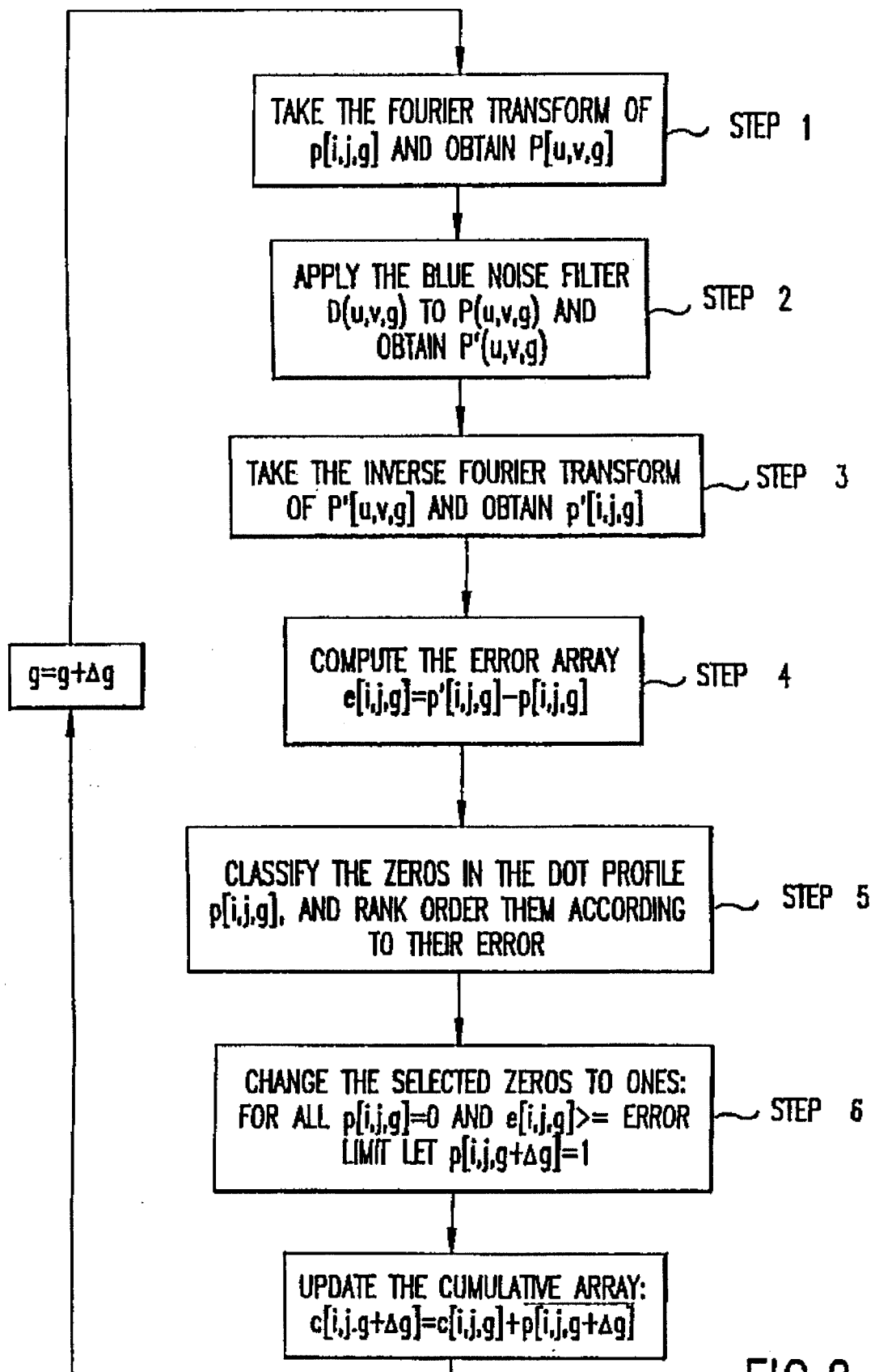
FIG. 2 is a diagram of a flow chart for the design of the blue noise mask of the present invention.

In general, the dot profile for the g+Δg level can be generated from the dot profile for the g level, as shown in FIG. 2. Up to Step 4, the procedure for the creation of the g+Δg dot profile is exactly the same as the procedure for the creation of the initial dot profile for the ½ level. It is important to note that in Step 2, the principal frequency of the blue noise filter is updated for every level according to equation (2). After Step 4, the purpose is to go up one gray level and thus only zeros are changed to ones. Using the error array, the pixels that contain a zero are classified in Step 5 and rank ordered, and then $N^2/2^B$ selected zeros are changed to ones in Step 6:

$$\forall p[i,j,g]=0 \cap e[i,j,g] \geq l_c \Rightarrow p[i,j,g+\Delta g]=1; g>½ \qquad (3)$$

Every time a zero is changed to one, the statistics of its neighborhood change and therefore the information contained in the error array for its neighboring pixels may not be valid any more. For that reason, only a few zeros are replaced with ones and then the error array is recalculated or an additional criteria is checked, such as, neighborhood mean and runlengths. Finally, the cumulative array is updated in Step 7 by adding one only to those pixels that still correspond to a zero in the dot profile p[i,j,g+Δg]:

$$c[i,j,g+\Delta g]=c[i,j,g]+\overline{p[i,j,g+\Delta g]}; g>½ \qquad (4)$$

where the bar indicates a logical "not" operation changing zeros to ones and vice versa.

In that fashion, when the blue noise mask is thresholded at a constant level g+Δg, the resulting binary pattern is the dot profile p[i,j,g+Δg]. That procedure is repeated until the dot profiles for all the gray levels from ½+Δg up to 1 are created. The levels from ½−Δg to 0 are created in the same way with the only difference that the ones are changed to zeros and the cumulative array is updated as follows:

$$c[i,j,g-\Delta g]=c[i,j,g,]-p[i,j,g-\Delta g]; g<½ \qquad (5)$$

When the process has been implemented for all gray levels g, the cumulative array contains the desired blue noise dot profile for all levels, and is therefore the desired blue noise mask.

Once the blue noise mask has been generated, as described in connection with FIGS. 1 and 2, it can be used in a halftoning process. Since halftoning using a blue noise mask is a point algorithm, it can therefore be implemented either digitally or optically.

Figure 3:
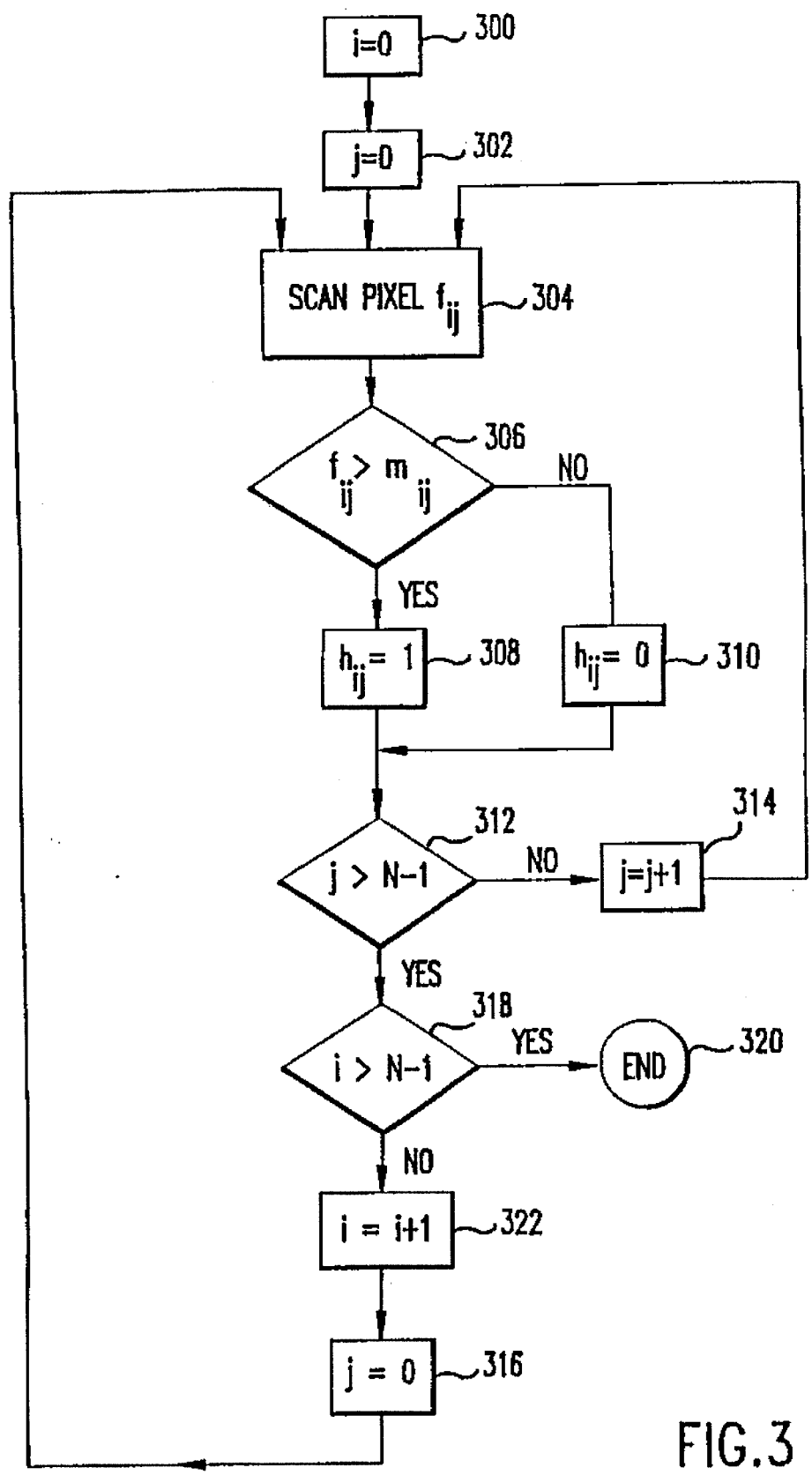
FIG. 3 is a diagram of a flow chart for the digital implementation of halftoning using a blue noise mask in accordance with the present invention.

A flow chart depicting the digital implementation of halftoning using a blue noise mask according to the present invention is shown in FIG. 3. In digital applications such as facsimile machines and laser printers, the instant method requires much less memory and/or computation than do other blue-noise-producing techniques such as error diffusion taught by Ulichney and by Sullivan et al. in U.S. Pat. No. 4,920,501, issued Apr. 24, 1990.

Figure 4:
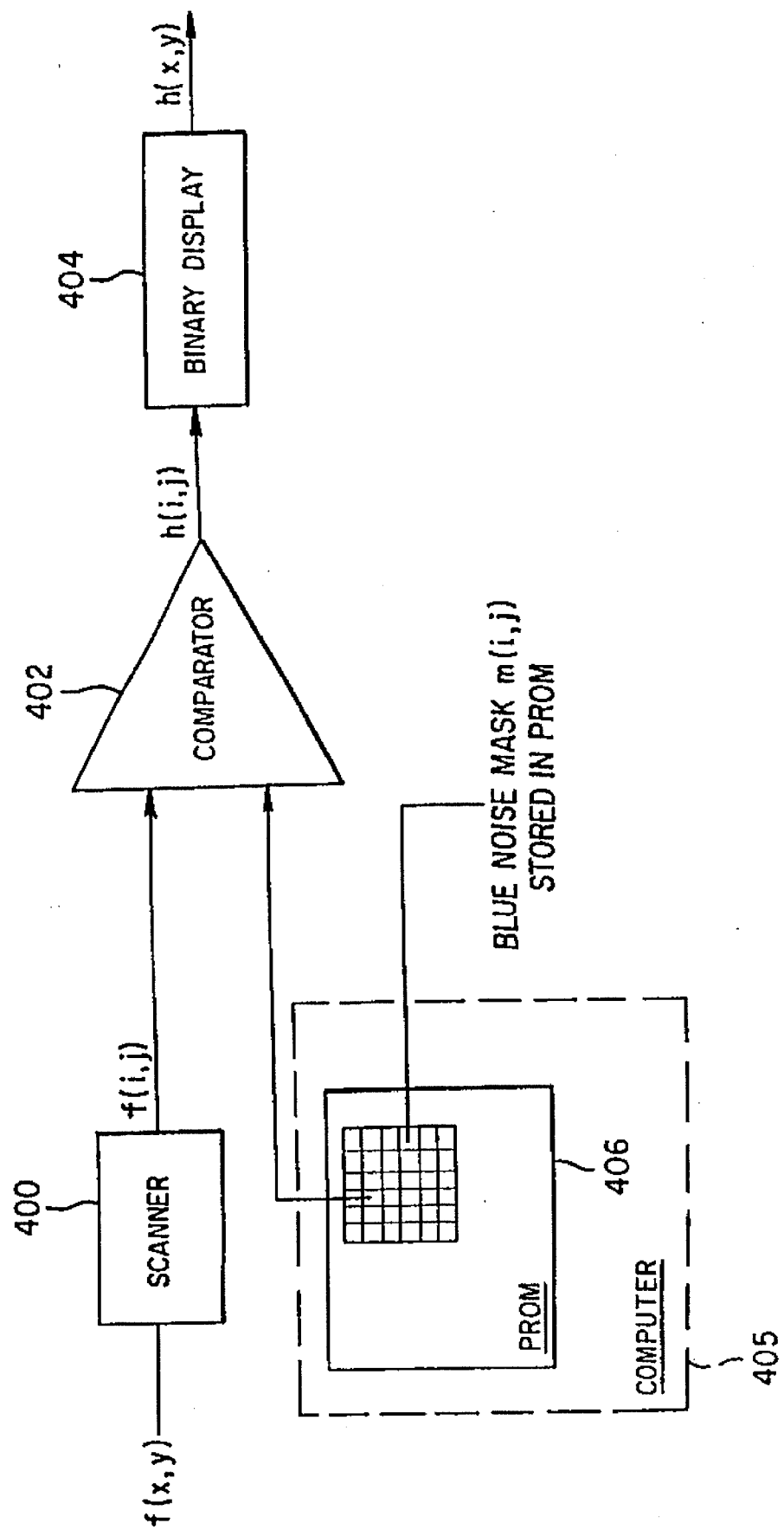
FIG. 4 is a schematic block diagram of a hardware system for digitally implementing halftoning using the blue noise mask in accordance with the present invention.

The necessary memory needed to store the blue noise mask array is stored on a PROM, as shown in FIG. 4. Then, the halftoning of a N×N gray scale image array f(i,j) against the blue noise mask array m(i,j) is implemented as follows: The i and j variables are first set to 0 at steps 300 and 302, respectively. The next pixel $f_{i,j}$ is then scanned at step 304. A determination is made at step 306 to determine if the value of that pixel $f_{i,j}$ is greater than the value of the corresponding element in the blue mask array $m_{i,j}$.

If it is determined at step 306 that the value of the gray scale image array pixel is less than the value of the blue noise mask array pixel, then the value of the resulting array $h_{i,j}$ is set equal to 0 at step 310.

If an affirmative determination is made at step 306, then the value of the resulting array element $h_{i,j}$ is set equal to 1 at step 308. After steps 308 and 310, a determination is then made at step 312 of whether j is greater than N−1. That indicates the end of a row or column. If a negative determination is made at step 312, then j is set equal to j+1 at step 314 and the program then returns to step 304 to scan the next pixel.

If an affirmative determination is made at step 312, that indicates that the end of the scanned line has been reached. Then, the instant method is applied to the first pixels (j=0) of the next line. A determination is then made at step 318 of whether i is greater than N−1. If an affirmative determination is made at step 318, that indicates that the end of the image has been reached, and the program then ends at step 320.

If a negative determination is made at step 318, that indicates that the end of the image may not have been reached and that additional pixels remain. Thus, the next line is scanned. The value of i is then set equal to i+1 at step 322, the value j is set equal to zero at step 316 and then the next pixel is scanned at step 304.

FIG. 4 shows an example of the hardware which may used for the digital implementation of halftoning using a blue noise mask as discussed in the instant application. It should be understood that the hardware implementation can be either digital or analog, for example, using an operational amplifier in place of the comparator 402 in the analog case. It is a significant advantage of digital halftoning using a blue noise mask that it is much faster than the other known blue noise producing techniques, because the halftoning is done by a simple pixelwise comparison. The digital halftoning using a blue noise mask process of the present invention can be speeded up even further by performing the comparison step in parallel, since all of the thresholds are preassigned.

As shown in FIG. 4, a scanner 400 is used to scan an image and convert the pixels on that image from an array of f(x,y) to the gray scale image array f(i,j). The output from the scanner 400 is fed to a first input of the comparator 402.

As previously described, the blue noise mask array m(i,j) is stored in the PROM 406 which may be located in a computer 405. The output from the PROM 406 is fed to the second input of the comparator 402. The output of the comparator is the binary image array h(i,j) which is fed to a binary display 404 which converts that array into the final image array h(x,y).

As previously discussed, the present halftoning using a blue noise mask invention can also be implemented in an optical or photographic manner. An example of an optical application of the present halftoning system is the photographic process used in newspaper printing. Such a process can be either multiplicative or additive.

Figure 5:
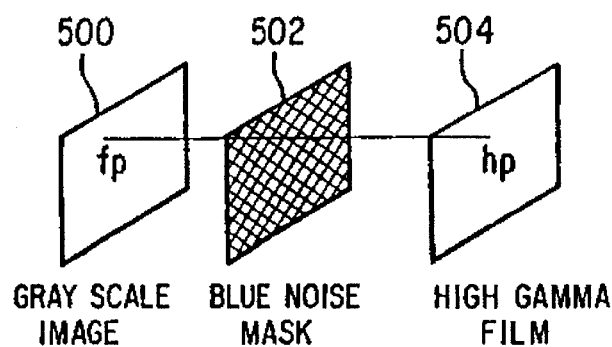
FIG. 5 is a drawing of a multiplicative photographic process utilized for optically implementing halftoning using a blue noise mask in accordance with the present invention.

In the multiplicative photographic process, the gray scale image f(x,y) 500 is photographed through the blue noise mask 502 which has a transmittance m(x,y) and the resultant superposition h(x,y)=f(x,y)×m(x,y) is printed onto high contrast film 504, such as high gamma film. That procedure is shown in FIG. 5. It should be understood than a point $f_p$ in the array f(x,y) corresponds to a dot $h_p$ in the array h(x,y), whose size and shape depends on the gray level that $f_p$ represents.

Figure 6:
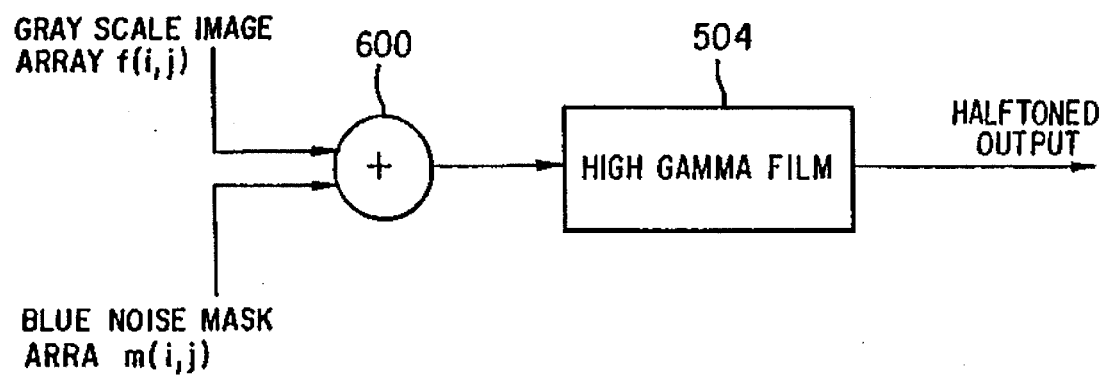
FIG. 6 is a drawing of an additive photographic process which may be utilized in the optical implementation of halftoning using a blue noise mask in connection with the process shown in FIG. 5.

FIG. 6 shows the additive photographic process in which the blue noise mask is added to the gray scale image at the film plane by a double exposure. The gray scale image array and blue noise mask array are added by adder 600 and then fed to the high gamma film 504 which produces the halftoned output. The adder 600 is in simplest form a repeated exposure of the film 504, where the image and the blue noise mask are exposed separately onto the film 504, which is then developed.

In general, a gray scale photographic blue noise mask m(x,y) can be obtained from a calculated array m(i,j) using a film printer such as a Dunn camera interfaced to a PROM or a computer. The conversion from discrete points to a continuous image is then given by equation (1). Print film or transparency film is exposed by the computer controlled film printer so as to produce a photographic blue noise mask.

The blue noise mask can also be used for halftoning in applications that involve multibit and color displays. The digital halftoning process for a binary display using a blue noise mask (FIG. 2) can also be expressed as follows:

$$h(i,j)=int\{m(i,j)+f(i,j)\} \quad (6)$$

wherein int denotes integer truncation and the gray levels of m(i,j) and f(i,j) vary between 0 and 1. In general, for a K-bit display, the output image array h(i,j) can be written as follows:

$$h_K(i,j) = \frac{1}{2^K - 1}\, int\{(2^K - 1)m(i,j) + f(i,j)\} \quad (7)$$

The $2^K-1$ threshold values are equally spaced between 0 and 1. A non-uniform quantizer is also possible.

It is also possible to modify the blue noise mask in order to minimize undesirable printer and media dependent effects. That may be accomplished by modifying the first order statistics or the cumulative distribution function (CDF) of the blue noise mask (BNM). Such modification is useful in an environment such as medical ultrasound imaging in which the user, using the present invention, may be able to select between high and low contrast images and the display and film characteristics of such medical ultrasound imaging equipment can be accounted for in each rendition. In the case of blue noise masks, a large unstructured pattern of, for example, 256×256 pixel kernels provides sufficient degrees of freedom with which to modify the CDF so as to provide both linear and non-linear mappings of the input and output. That makes it possible to construct specialized blue noise masks for a particular output printer. Medium characteristics can also be minimized in such modified blue noise masks. Therefore, as will be described hereafter, the present invention provides for the altering of the cumulative distribution function of the blue noise mask that would otherwise be utilized so as to produce unique and more desirable input-output characteristics. While three such examples of such modified blue noise masks are discussed herein, those of ordinary skill in the art will readily recognize other ways in which to modify the blue noise mask in order to achieve similar results.

The first order statistics of the blue noise mask can be obtained directly from the mask itself as previously discussed. The method for modifying the mask involves taking each individual value of the mask and mapping it into a new value (known as direct value mapping), while avoiding certain extreme points of the blue noise mask. In that manner, the same, non-clumpy image can be produced. The mapping can be performed in such a manner that some undesirable printer output characteristics can be eliminated. For instance, when the output device produces low contrast images, the mapping can be chosen to modify the mask and the CDF of the mask in order to enable more pixels to be deposited in the light and dark regions. That will result in the production of a higher contrast image.

The mapping function operates on pixels of the blue noise mask, $b(i,j)$, that are equal to a specific value, $g$, and sets that specific value equal to a new value, $g'$:

$$\text{for all } b(i,j)=g \Rightarrow b'(i,j)=g' \tag{8}$$

where $f(g)=g'$ is a single valued, non-linear mapping function chosen to alter the image rendering, and $b'(i,j)$ is the output, modified blue noise mask.

Figure 7:
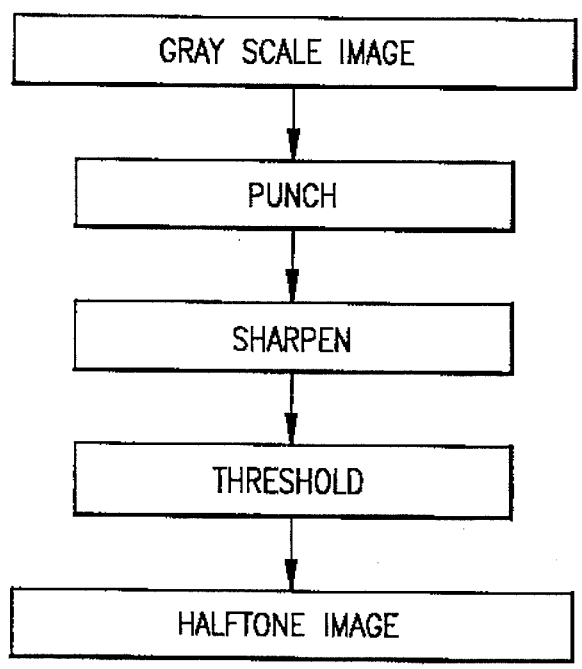
FIG. 7 is a diagram of a flow chart showing the modification of a blue noise mask to produce a punched, linearized version of that blue noise mask.
Figure 8:
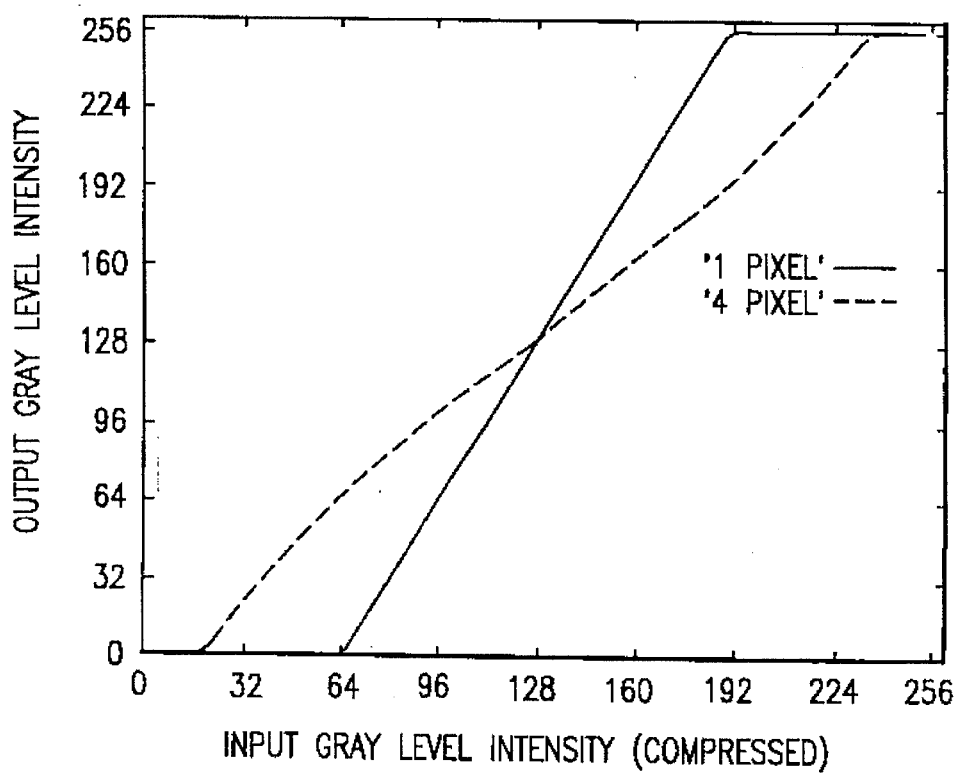
FIG. 8 is a diagram of a flow chart for the modification of a blue noise mask using the concave down sigma curve modification to produce a high resolution version of the blue noise mask.
Figure 9:
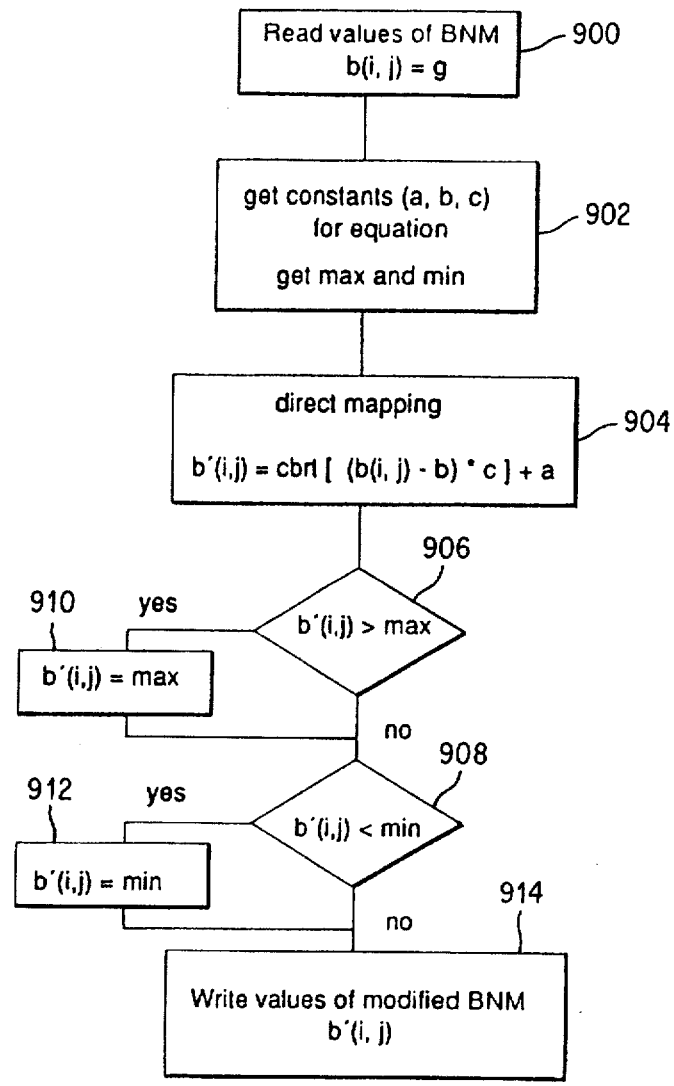
FIG. 9 is a diagram of a flow chart for the modification of a blue noise mask using the concave up sigma curve modification to produce a low resolution version of the blue noise mask.
Figure 10:
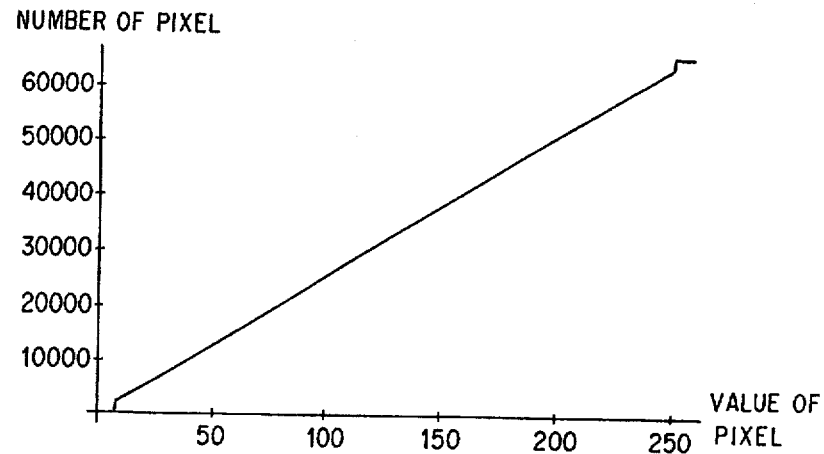
Figure 11:
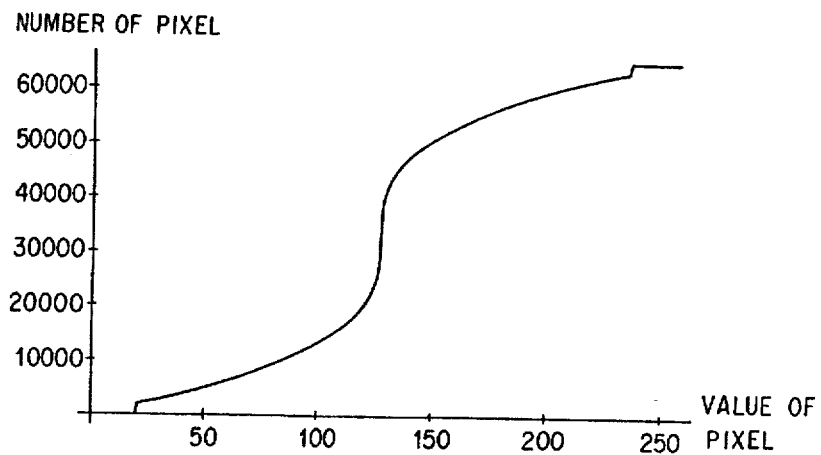
Figure 12:
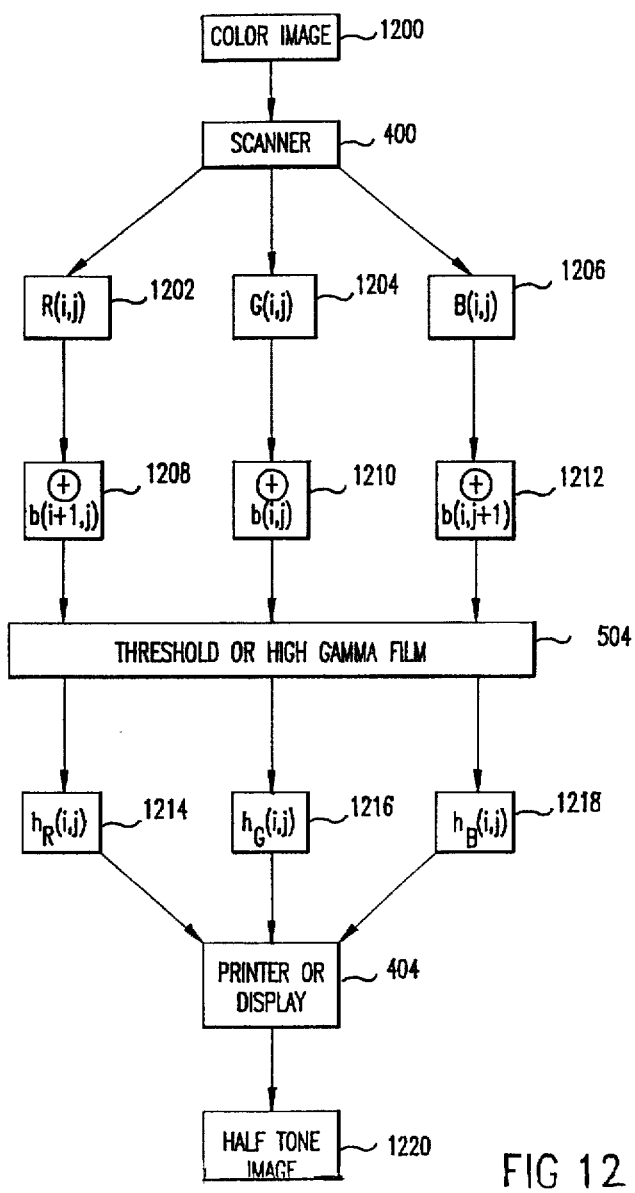

FIGS. 7–9 show diagrams of the flow charts for producing three different modifications of the blue noise mask, the linear or punch version, the high contrast concave down sigma curve (CDSC) and the low contrast concave up sigma curve (CUSC). All versions include the "punch". Punching the blue noise mask means that the extreme low values are set to a certain minimum value, such as 0, and that the extreme high values are set to a certain maximum value, such as 255, and the values between the maximum and minimum values are then re-linearized.

The CDSC modification of the blue noise mask is accomplished by setting $f(g)=g^3$ which produces a "high contrast" mapping. The CUSC modification sets $f(g)=$to $g^{-3}$, thus producing a flatter or low contrast curve.

After the modification of the blue noise mask is accomplished, halftoning of the desired image using that mask is done in the manner previously described. That is, the halftoning is performed by comparing the values of the image with the values of the modified mask. If the value of the image is larger, the value of the new image is rendered as black. Otherwise, the value of the new image will be set to white. The new image is then stored in a more compact form (reduced from 8-bits) because there is only one bit per pixel in a binary or halftone image. In the modified masks, each value in the blue noise mask is mapped to a new value based upon the variable selected by the user, such as punch, CDSC and CUSC. Halftoning is then performed based on those new values. By choosing different values, users can modify the image to eliminate artifacts and other defects caused by the specific printer and/or media being utilized.

The new halftone screens created using the modified CDF or gray scale characteristics of the blue noise mask have non-linear input-output characteristics. While the gray scale characteristics of the blue noise mask are modified, the isotropic, unstructured, visually pleasing pattern of black and white pixels produced by such blue noise masks are preserved.

FIG. 7 is a diagram of the flow chart for modifying a blue noise mask to produce a linearized version of the initial blue noise mask. At step 700, the value $b(i,j)=g$ of the blue noise mask to be modified is read. At 702, the maximum and minimum values specified by the user are obtained. The values of the blue noise mask obtained at step 700 are then re-linearized at step 704 by setting $r=255/(max-min)$ and then calculating the values of the modified blue noise mask $b'(i,j)=((b(i,j))-min)*r$. In this example, we assume an 8-bit blue noise mask is being used, hence, max and min will lie between 0 and 255, respectively.

A determination is then made at step 706 of whether each value of the modified blue noise mask $b'(i,j)$ is greater than the max value. If an affirmative determination is made at step 706, then the value of that pixel $b'(i,j)$ is set equal to the max value. After step 710 or if a negative determination is made at step 706, then a determination is made at step 708 of whether the value of the pixel of the modified blue noise mask $b'(i,j)$ is less than the minimum value. If an affirmative determination is made at step 708, then the value of that pixel $b'(i,j)$ is set equal to the minimum value at step 12. After step 712 or if a negative determination is made at step 708, the modified blue noise mask is assembled by writing the values of such modified blue noise mask $b'(i,j)$ into memory at step 714.

FIG. 8 shows a diagram of the flow chart for generating a modified high contrast version of the blue noise mask. At step 800, the values of the blue noise mask $b(i,j)=g$ are read. At step 802, the constants a, b, c which are to be utilized in step 804 are obtained from the user, as well as the max and min values. The constants a, b and c are chosen so as to generate unique mathematical mapping. The center point of inflection is given by the constant a, usually chosen near 128 for a symmetric, 8-bit mask. The steepness of the curve is given by the constant c and the offset of the curve, if desired, by the constant b.

Figure 10:
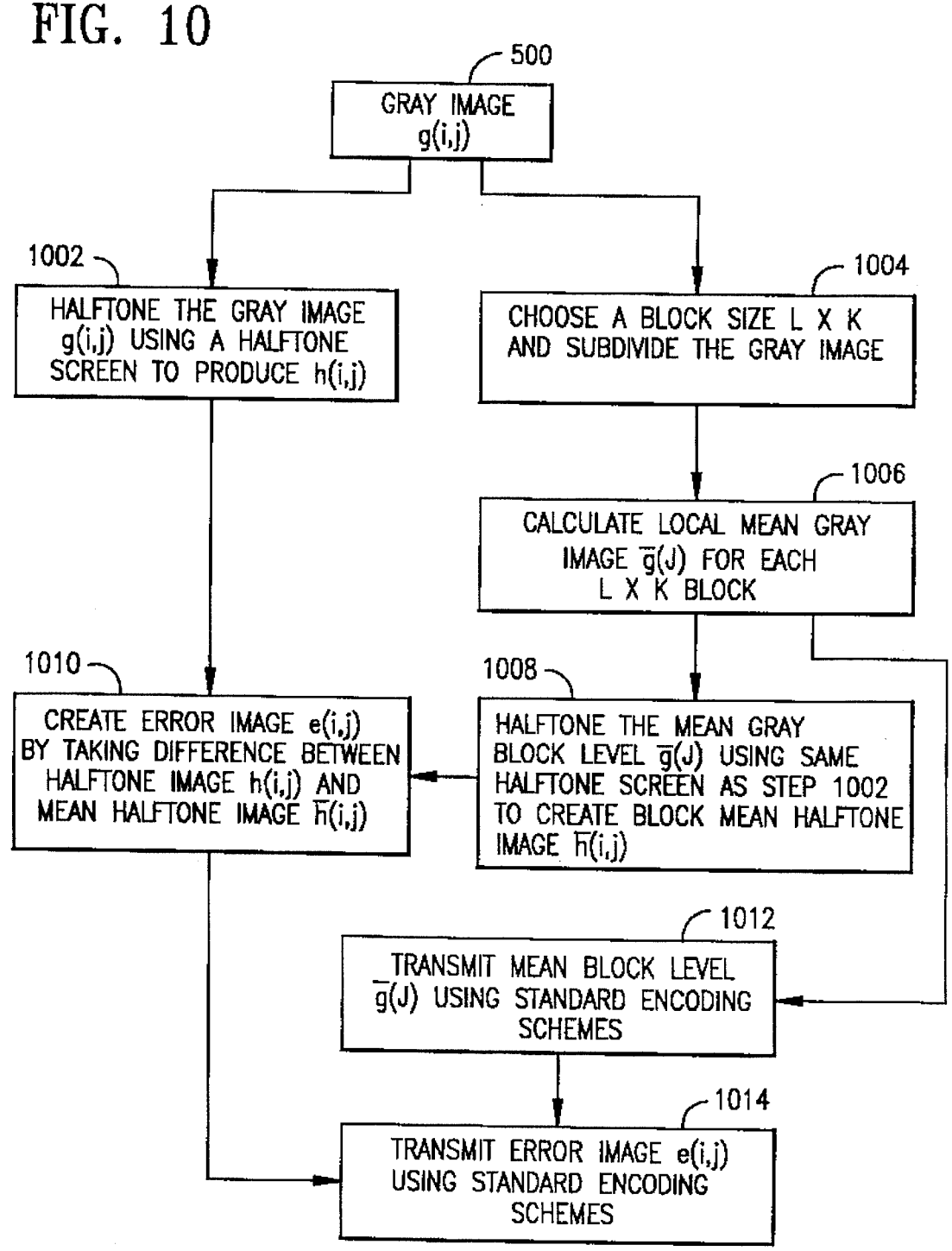
FIG. 10 is a drawing showing the relationship of the number of pixels to the value of pixels for a linear blue noise mask.
Figure 11:
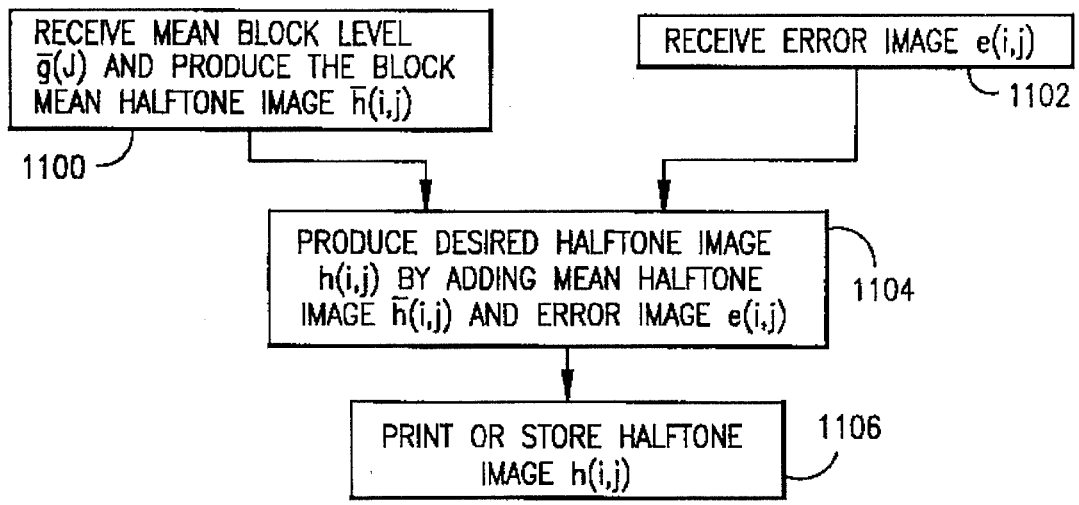
FIG. 11 is a drawing showing the relationship between the number of pixels and the value of pixels for a non-linear, high contrast blue noise mask produced after applying the CDSC direct mapping processing with punch.

Directly mapping occurs at step 804 in which each pixel value for the modified blue noise mask $b'(i,j)$ is calculated to be equal to $(b(i,j)-a)^3/c^3+b$. This function replaces a linear input-output relation with a steepened, non-linear relation. The linear input-output relation being replaced is shown, for example, in FIG. 10 which shows the CDF versus the value of pixels for a linear blue noise mask. FIG. 11 shows the CDF versus the value of pixels for a non-linear, high contrast blue noise mask, after applying the CDSC direct mapping with punch.

A determination is then made at step 806 of whether each new pixel value $b'(i,j)$ is greater than the maximum value. If an affirmative determination is made at step 806, then the new pixel value $b'(i,j)$ is set equal to the maximum value at step 810. After step 810 or if a negative determination is made at step 806, then a determination is made at step 808 of whether the new pixel value $b'(i,j)$ is less than the minimum value.

If an affirmative determination is made at step 808, then the new pixel value $b'(i,j)$ is set equal to the minimum value. After step 812 or if a negative determination is made at step 808, then the values of the modified blue noise mask $b'(i,j)$ are written into memory at step 814.

FIG. 9 shows a diagram of the flow chart for the modification of a blue noise mask to produce a CUSC low contrast version of the original blue noise mask. The values of the blue noise mask b(i,j)=g are read at step 900 and then the constants a, b and c are obtained, as well as the maximum and minimum values at step 902. Such constants and maximum and minimum values are provided by the user.

At step 904, a direct mapping process is accomplished in which the array of values of the modified blue noise mask b'(i,j) is calculated as equal to cbrt (b(i,j)−b)*c+a. This function, where "cbrt" stands for the cube root, changes a linear input-output relation to a low contrast, non-linear input-output relation. The constants a, b and c give the offset, center point and gain, respectively.

At step 906, a determination is made for each pixel of the blue noise mask of whether its value is greater than the maximum value. Thus, a determination is made of whether b'(i,j) is greater than the maximum value.

If an affirmative determination is made at step 906, then for each pixel in the array b'(i,j) which is greater than the maximum value, its value is set to the maximum value at step 910.

If a negative determination is made at step 906 or after step 910, a determination is made at step 908 of which pixel value, if any, in the modified blue noise mask b'(i,j) is less than the minimum value. If an affirmative determination is made at step 908, then for each pixel value in the modified blue noise mask b'(i,j) which is less than the minimum value, that value is set equal to the minimum value at step 912.

After step 912 or if a negative determination is made at step 908, the values of the modified blue noise mask b'(i,j) are written into memory at step 914.

The instant method can also be applied to color halftoning, by independently thresholding each one of the component colors against the blue noise mask and then overprinting. In that manner, the blue noise mask disclosed herein can be applied simply to the component colors of RGB, CMYK and others for color printing. For example, an Optronix scanner can be used as the scanner 400 shown in FIG. 4 to input three separate files of 8-bits in depth each, for the red, blue and green components of an image. Prior to displaying such image, a blue noise mask generated according to the method disclosed herein can be applied separately to each of the red, green and blue images. The resulting images may then be displayed on a binary RGB video screen or printed.

It has also been discovered that an improvement in the clarity of the displayed RGB image can be achieved when the pixels of the blue noise mask are shifted by one pixel when used on the different color planes. For example, the (i,j) pixel of the blue noise mask can be shifted such that the blue noise mask which is applied to the red image color plane has each of its pixel values shifted up by one pixel when halftoning the red image. When halftoning the blue image, the blue noise mask has each of its pixel values shifted by one pixel to the side. In that manner, the color energy is spread out over a larger space. It should be noted, however, that no shifting of the RGB images with respect to each other occurs, as that would cause blurring of the resulting image. Instead, as discussed above, the respective blue noise masks used to halftone the red and blue images have their pixel values shifted by one pixel up or to the side, respectively.

Figure 12:
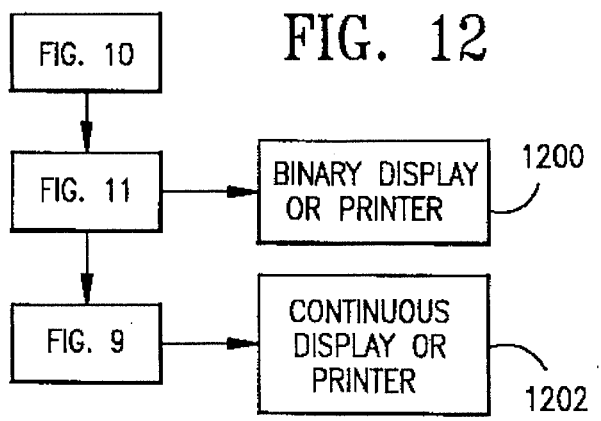
FIG. 12 is a diagram of a flow chart showing the application of a blue noise mask to color halftoning.
Figure 13:
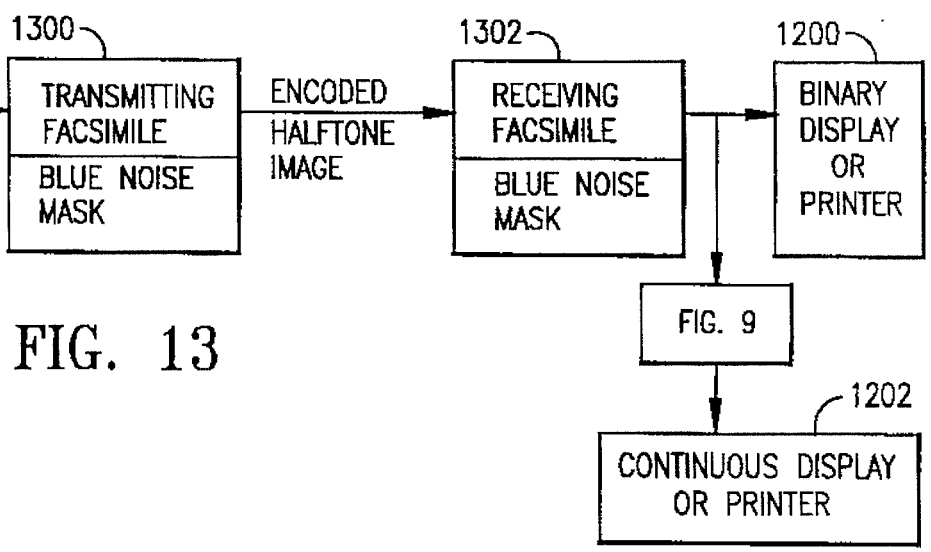
Figure 7:
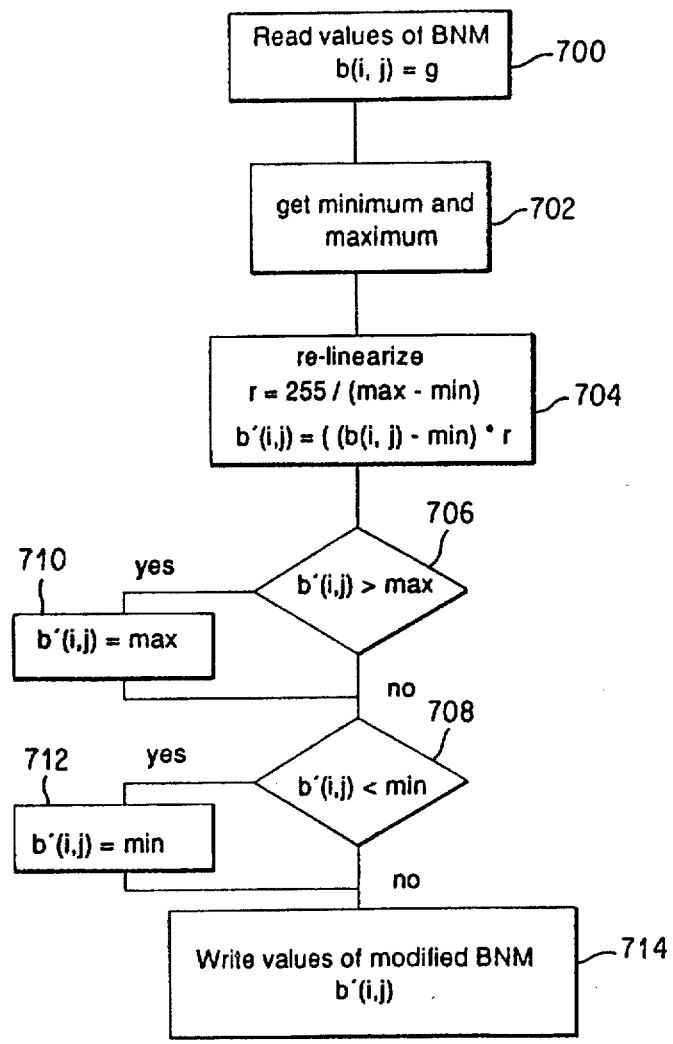
Figure 8:
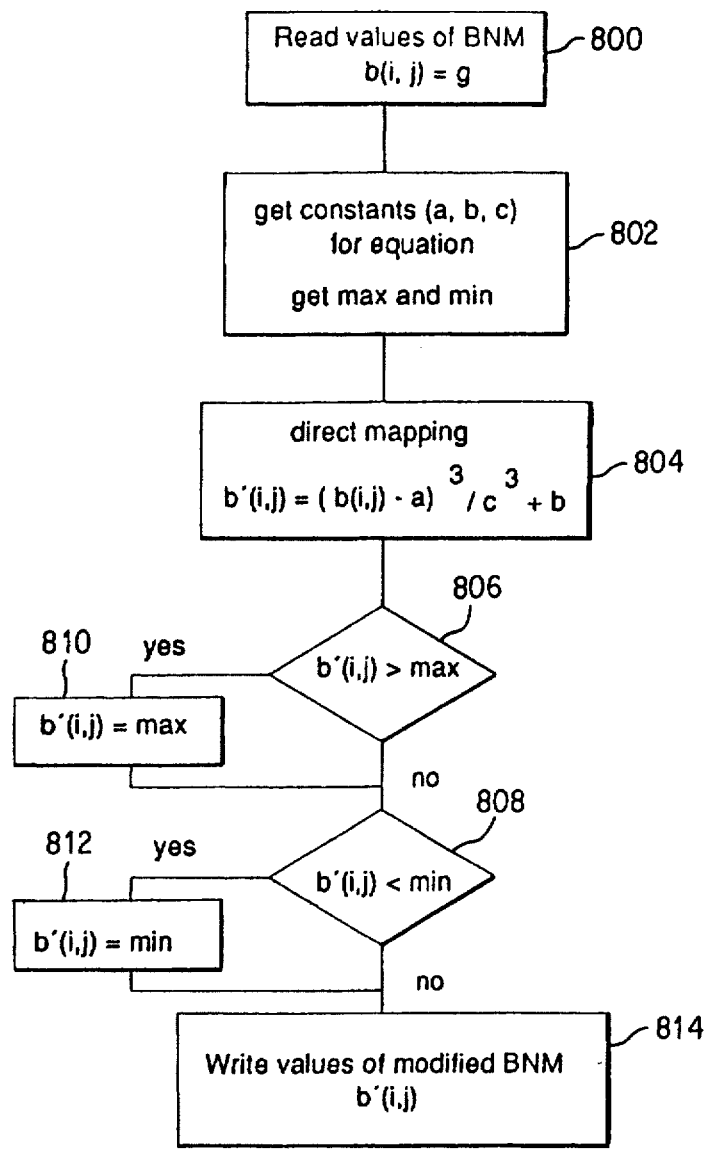

The foregoing method is shown in FIG. 12 which is a diagram of a flow chart for implementing halftoning of a color image using the foregoing method. The color image 1200 to be scanned is scanned by a scanner 400 to produce three continuous tone color planes 1202, 1204 and 1206, one for each of the three colors, red, green and blue, respectively. The values in each of these planes or arrays are added to the blue noise mask as shown in FIG. 6. Alternatively, a comparator can be used, as shown in FIG. 4. However, the (i,j) pixel of the red image is compared against the shifted (i+1,j) pixel of the blue noise mask. The (i,j) pixel of the green image is compared against the (i,j) pixel of the blue noise mask. The (i,j) pixel of the blue image is compared against the (i,j+1) pixel of the blue noise mask. Such comparisons take place at steps 1208, 1210 and 1212.

Each of these three planes or arrays are thresholded or are printed on high gamma film at step 504 in order to produce three halftone images at steps 1214, 1216 and 1218. The halftone image $h_R(i,j)$ represents the (i,j) pixel of the halftone red image. The elements at 1216 and 1218 likewise represent the halftone of the green and blue images, respectively. These images are combined at step 404 by a printer or display in order to produce a three color halftone image at step 1220. It should be noted that the halftoning of each of the components of the color image uses a shifted version of the blue noise mask as disclosed herein to produce a useful spreading out of the color without introducing blur into the halftone image.

A variation of this method of separately halftoning the different color planes of an image is to use the inverse of a blue noise mask for one color, where the inverse is defined as (Maxval-BNM) for each pixel. The Maxval is the maximum value of the blue noise mask (for example, 255 for the 8-bit blue noise mask). To produce the modified blue noise mask, the value of each pixel is subtracted from the Maxval to produce each new value for each pixel. This inverse process can be thought of as exchanging the "peaks and valleys of the blue noise mask," and results in the spreading out of the energy in the color pattern of the color image.

Many modifications of this process are likewise possible, such as different one shift patterns, or multiple shift patterns of the pixel values of a generated blue noise mask. While it has been found, for example, in low resolution 300 dpi systems, that one pixel shift produces a visually pleasing result, ten shifts have been found to produce an annoying correlation between different color dots while larger shifts of about forty-five pixels produce an acceptable, uncorrelated pattern of colored dots.

Of course, other possible modifications can also produce acceptable results, for example, the placing of one color plane blue noise mask at 45° with respect to another as is done in conventional four color printing. However, it has been found that the simple one-shift pattern described above is most effective at producing a pleasing, isotropic, non-clumpy moire resistant pattern with some spreading out of the color or ink but with no blurring of the image. Similar principles apply of course for CMYK color printing, where the halftoning can be done on the C, M and Y color images, and then the black image (K) can be added as necessary according to conventional color printing models.

Although only a preferred embodiment is specifically illustrated and described herein, it will be readily appreciated that many modifications and variations of the present invention are possible in light of the above teachings and within the purview of the appended claims without departing from the spirit and intended scope of the invention.

What is claimed is:

1. A method for the halftoning of color images which comprises the step of utilizing, in turn, a pixel-by-pixel comparison of each of a plurality of color planes of said color image against a mask in which the mask comprises a non-determinate, non-white noise single valued function which is designed to provide visually pleasing dot profiles when thresholded and wherein said step of utilizing said pixel-by-pixel comparison is used to produce a halftoned image.

2. The method of claim 1, wherein said mask has a maximum size value and wherein a plurality of masks are separately utilized to perform said pixel-by-pixel comparison and in which at least one of said masks has its pixels modified by replacing the value of each pixel with a value corresponding to the difference between said maximum size value and the pixel value prior to performing said pixel-by-pixel comparison.

3. A method of halftoning a color image by utilizing a pixel-by-pixel comparison of said color image against at least one blue noise mask stored in a first memory, comprising the steps of:
  a) scanning said color image to be halftoned to create a plurality of color plane image arrays, said scanning being performed on a pixel-by-pixel basis;
  b) storing each of said plurality of color plane image arrays in a second memory;
  c) comparing, on a pixel-by-pixel basis, the value of each corresponding pixel in a respective one of said at least one blue noise mask and each of said plurality of color plane image arrays to produce a plurality of binary color plane image arrays; and
  d) converting said plurality of binary color plane image arrays to a halftoned color image.

4. The method of claim 3, further including the step of producing at least one modified blue noise mask in addition to said blue noise mask prior to performing said comparing step; said at least one modified blue noise mask being generated by shifting the pixels of said blue noise mask by at least one pixel position from their position in said blue noise mask.

5. The method of claim 4, wherein said at least one modified blue noise mask is compared, on a pixel-by-pixel basis, to the value of each corresponding pixel in at least one of said plurality of color plane image arrays.

6. The method of claim 3, further including the step of producing at least one modified blue noise mask in addition to said blue noise mask prior to performing said comparing step; said at least one modified blue noise mask having a predetermined maximum value and being generated by subtracting the value of each pixel of said blue noise mask from said maximum value to produce said modified blue noise mask.

7. The method of claim 4, wherein said at least one modified blue noise mask is independent and uncorrelated with any other blue noise mask.

8. A method of halftoning a color image by utilizing a pixel-by-pixel comparison of said color image against at least one blue noise mask stored in a first memory, comprising the steps of:
  a) acquiring said color image to be halftoned to create a plurality of color plane image arrays, said acquiring being performed on a pixel-by-pixel basis;
  b) storing each of said plurality of color plane image arrays in a second memory;
  c) comparing, on a pixel-by-pixel basis, the value of each corresponding pixel in a respective one of said at least one blue noise mask and each of said plurality of color plane image arrays to produce a plurality of binary color plane image arrays; and
  d) converting said plurality or binary color plane image arrays to a halftoned color image.

9. A method for halftoning a color image by utilizing a pixel-by-pixel comparison of said color image against a first blue noise mask stored in a first memory, comprising the steps of:
  a) acquiring said color image to be halftoned to create at least first and second color plane arrays, said acquiring being performed on a pixel-by-pixel basis;
  b) storing each of said at least first and second color plane arrays in a second memory;
  c) producing a second blue noise mask by shifting the pixels of said first blue noise mask at least one pixel position away from their position in said first blue noise mask;
  d) comparing, on a pixel-by-pixel basis, the value of each corresponding pixel in said second blue noise mask and one of said at least first and second color plane arrays to produce a first binary color plane image array;
  e) comparing, on a pixel-by-pixel basis, the value of each corresponding pixel in said first blue noise mask and a remaining one of said at least first and second color plane arrays not already compared to a different blue noise mask to produce a second binary color plane image array; and
  f) using said first and second binary color plane image arrays in forming a halftoned color image.

10. The method of claim 9, further including the steps of:
  a) producing a third blue noise mask by shifting the pixels of said first blue noise mask at least one pixel position away from their position in said first blue noise mask in a direction different from that used in said step of producing said second blue noise mask; and
  b) comparing, on a pixel-by-pixel basis, the value of each corresponding pixel in said third blue noise mask and a different one of said at least first and second color plane arrays to which said second blue noise mask was compared, prior to said comparing step using said first blue noise mask.

11. A method for the halftoning of color images which comprises the step of utilizing, in turn, a pixel-by-pixel comparison of each of a plurality of color planes of said color image against a respective one of a plurality of masks in which each respective mask comprises a non-deterministic, non-white noise single valued function which is designed to provide visually pleasing dot profiles when thresholded and wherein said step of utilizing said pixel-by-pixel comparison is used to produce a halftoned image.

* * * * *

UNITED STATES PATENT AND TRADEMARK OFFICE
CERTIFICATE OF CORRECTION

PATENT NO. : 5,543,941  
DATED : August 6, 1996  
INVENTOR(S) : Parker et al.

Page 1 of 6

It is certified that error appears in the above-indentified patent and that said Letters Patent is hereby corrected as shown below:

IN THE DRAWINGS:

Delete Figures 7-13 and replace with attached Figures 7-12.

Signed and Sealed this

Twenty-ninth Day of April, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,543,941

DATED : August 6, 1996

INVENTOR(S) : Parker et al.

Page 1 of 5

It is certified that error appears in the above-indentified patent and that said Letters Patent is hereby corrected as shown below: ON THE TITLE PAGE:

IN THE REFERENCES CITED and OTHER PUBLICATIONS:

Please add the following patents and articles:

| | | |
|---|---|---|
| --4,783,838 | 1988 | Matsunawa |
| 4,742,558 | 1988 | Ishibasi et al. |
| 4,084,196 | 1987 | Tisue et al. |
| 5,010,398 | 1991 | Nys et al. |
| 4,997,733 | 1991 | Carleer et al. |
| 4,975,786 | 1990 | Katayama et al. |
| 4,974,067 | 1990 | Suzuki et al. |
| 4,924,301 | 1990 | Surbrook |
| 4,920,501 | 1990 | Sullivan et al. |
| 4,912,569 | 1990 | Petilli |
| 4,885,576 | 1989 | Pennebaker et al. |
| 4,819,075 | 1989 | Imaide et al. |
| 4,800,442 | 1989 | Riseman et al. |
| 4,786,975 | 1988 | Postl |
| 4,758,886 | 1988 | Rylander |
| 4,736,254 | 1988 | Kotera et al. |
| 4,700,235 | 1987 | Gall |
| 4,698,691 | 1987 | Suzuki et al. |
| 4,669,869 | 1987 | Sullivan |
| 4,657,831 | 1987 | Ambro et al. |
| 4,477,833 | 1984 | Clark et al. |

UNITED STATES PATENT AND TRADEMARK OFFICE
CERTIFICATE OF CORRECTION

PATENT NO. : 5,543,941
DATED : August 6, 1996
INVENTOR(S) : Parker et al.

Page 2 of 5

It is certified that error appears in the above-indentified patent and that said Letters Patent is hereby corrected as shown below:

| | | |
|---|---|---|
| 4,425,642 | 1984 | Moses et al. |
| 4,412,256 | 1983 | Heinzl et al. |
| 4,409,623 | 1983 | Kobayashi et al. |
| 4,342,046 | 1982 | Kamata |
| 4,308,553 | 1981 | Roetling |
| 4,276,569 | 1981 | Kirk, Jr. |
| 3.085,878 | 1963 | Archer |
| 4,456,924 | 1984 | Rosenfeld, G. |
| 4,499,489 | 1985 | Gall et al. |
| 5,214,517 | 1993 | Sullivan et al. |
| | | |
| 0,152,355 | 1985 | Europe |
| W09,004,898 | 1990 | PTC |

"Digital Color Reproduction," IBM Technical Disclosure Bulletin, Vol. 28, No. 1, June 1985, pp. 438-439.

Netravali et al., "A Picture Browsing System," IEEE Transactions of Communications, Vol. Com-29, No. 12, December 1981.

J.C. Stoffel, J.F. Moreland, "A Survey of Electronic Techniques for Pictorial Image Reproduction", IEEE Transactions, December 1981.

G. Goertzel, G.R. Thompson, "Digital Halftoning on the IBM 4250 Printer", I.B.M. Journal of Res. Develop., January 1987.

"Dithering with Blue Noise", Robert A. Ulichney, Proceedings of the IEEE, Vol. 76, No. 1, January 1988, pp. 56-79.

UNITED STATES PATENT AND TRADEMARK OFFICE
CERTIFICATE OF CORRECTION

PATENT NO. : 5,543,941
DATED : August 6, 1996
INVENTOR(S) : Parker et al.

Page 3 of 5

It is certified that error appears in the above-indentified patent and that said Letters Patent is hereby corrected as shown below:

Pirsch et al., "Transmission of Gray Level Images by Multilevel Dither Techniques", Computers & Graphics, Vol. 7, 1983, pp. 31-44.
Yoshida et al., "Pel Pattern Predictive Coding of Dithered Images" Fujitsu-Scientific and Technical Journal, March 1984, pp. 99-118.
M. Broja, F. Wyrowski, and O. Bryngdahl, "Digital Halftoning by Iterative Procedure" Optics Communications, 69(3,4):205-210, January, 1989.--

Please make the following corrections:
Title page:
Page 2, column 1, line 27, change "Melntchuck" to --Melnychuck--; and change "Fourtier" to --Fourier--.
Page 2, column 2, line 1, change "half" to --Half--.
Page 2, column 2, lines 28-29, change "Siggrpaph" to --SIGGRPAPH--.
Page 2, column 2, line 33, change "inl" to --ink--.
Page 2, column 2, line 36, change "An adaptive" to --Adaptive--.
Page 2, column 2, line 40, change "76" to --75--.
Page 2, column 2, line 58, change "Siggrpaph" to --SIGGRPAPH--.
Page 3, column 1, line 30, change "whenshould" to --when should--.
Page 3, column 1, line 34, change "depenndency" to --dependency--.
Page 3, column 1, line 39, change "Mesereau" to --Mersereau--.
Page 3, column 1, line 61, change "moire" to --Moire--.
Page 2, column 2, line 39, change "Floyd" to --Floyd, --; and change "adoptive" to --adaptive--.

UNITED STATES PATENT AND TRADEMARK OFFICE
CERTIFICATE OF CORRECTION

PATENT NO.   : 5,543,941
DATED        : August 6, 1996
INVENTOR(S)  : Parker et al.

It is certified that error appears in the above-indentified patent and that said Letters Patent is hereby corrected as shown below:

Column 1, line 21, change "hi-level" to --bi-level--;
            line 38, change "a periodic" to --aperiodic--.
      Column 2, line 44, change "recursire" to --recursive--.
      Column 5, line 19, change "moire" to --Moire--;
            line 44, change "moire" to --Moire--.
      Column 6, line 30, change "energy/" to --energy--.
      Column 8, line 56, change "a periodic" to --aperiodic--.
            line 60, change "$\triangle$" to --$\Delta$--.
      Column 9, line 52, change "transform" to --Transform--;
            line 62, change "t," to --$\epsilon$,--;
            line 64, change the first occurrence of "=t" to --=$\epsilon$-- and change the second occurrence of "=t" to --=-$\epsilon$--.
      Column 10, line 28 change "1/2level" to --1/2 level--;
            line 51, formula 4, change "p[i,j,g+$\Delta$g]" to --$\overline{p[i,j,g+\Delta g]}$--;
            line 64, formula 5, change "[i,j,g,]" to --[i,j,g]--.
      Column 12, line 17, change "than" to --that--.
      Column 14, line 26, change "12" to --712--.

Column 16, line 46, change "moire" to --Moire--.

UNITED STATES PATENT AND TRADEMARK OFFICE
CERTIFICATE OF CORRECTION

PATENT NO. : 5,543,941
DATED : August 6, 1996
INVENTOR(S) : Parker et al.

It is certified that error appears in the above-indentified patent and that said Letters Patent is hereby corrected as shown below:

IN THE CLAIMS:

Claim 1, line 5, change "non-determinate" to --non-deterministic--.

Signed and Sealed this

Seventeenth Day of March, 1998

Attest:

BRUCE LEHMAN

Attesting Officer

Commissioner of Patents and Trademarks